US006452290B1

(12) United States Patent
Yoshioka et al.

(10) Patent No.: US 6,452,290 B1
(45) Date of Patent: Sep. 17, 2002

(54) BALANCING PARALLEL INVERTER SYSTEMS

(75) Inventors: Toru Yoshioka, Nitta-machi (JP); Masao Namai, Nitta-machi (JP); Yuji Nakamura, Nitta-machi (JP); Hidetake Hayashi, Seto (JP); Hitoshi Takimoto, Seto (JP)

(73) Assignees: Sawafuji Electric Co., Ltd. (JP); Kabushiki Kaisha Toshiba (JP)

( * ) Notice: Subject to any disclaimer, the term of this patent is extended or adjusted under 35 U.S.C. 154(b) by 0 days.

(21) Appl. No.: 09/902,906

(22) Filed: Jul. 11, 2001

(30) Foreign Application Priority Data

Jul. 12, 2000 (JP) .......................................... 2000-211175

(51) Int. Cl.[7] ................................................. H02J 1/00
(52) U.S. Cl. ......................................................... 307/82
(58) Field of Search ............................. 307/82, 73, 85, 307/86, 87, 60

(56) References Cited

U.S. PATENT DOCUMENTS 4,728,806 A * 3/1988 Baker et al. ................... 307/43

FOREIGN PATENT DOCUMENTS

JP 2678991 4/1989
JP 2000-32764 1/2000

* cited by examiner

Primary Examiner—Shawn Riley
(74) Attorney, Agent, or Firm—McGlew and Tuttle, P.C.

(57) ABSTRACT

An inverter parallel operation system includes a first inverter adapted to control the output frequency thereof by controlling a control element. The system includes the inverter, and a second inverter and subsequent inverters adapted to control the output frequency thereof by controlling control elements comprising the inverters. Power being fed to a common load after a choke coil provided on the output-side end of a first filter provided on the output side of the first inverter has been connected to a choke coil provided on the output-side end of the second filter on the output side of the second and subsequent inverters. The improvement comprising controlling effective powers output by the first inverter, and the second and subsequent inverters by detecting the effective powers output by both the inverters and controlling any one or both of the output frequencies predetermined in accordance with the effective powers.

23 Claims, 23 Drawing Sheets

FIG. 2

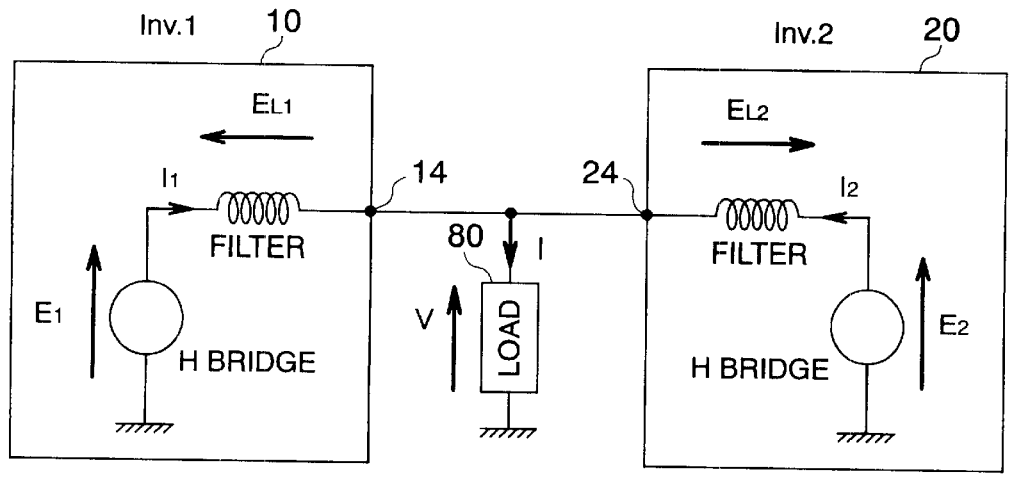

FIG. 3

| $E_1$ | FILTER INPUT-SIDE VOLTAGE (INVERTER INTERNAL VOLTAGE) ON THE SIDE OF INV.1 |
|---|---|
| $E_{L1}$ | VOLTAGE APPLIED TO THE FILTER ON THE SIDE OF INV.1 |
| $I_1$ | OUTPUT CURRENT ON THE SIDE OF INV.1 |
| $\theta_1$ | PHASE DIFFERENCE BETWEEN $E_1$ AND V |
| $Z_{L1}$ | IMPEDANCE OF THE FILTER ON THE SIDE OF INV.1 |
| $X_{L1}$ | REACTANCE COMPONENT OF THE FILTER ON THE SIDE OF INV.1 |
| $R_{L1}$ | RESISTANCE COMPONENT OF THE FILTER ON THE SIDE OF INV.1 |
| $\phi_1$ | PHASE DIFFERENCE BETWEEN $E_1$ AND $I_1$ |
| V | VOLTAGE APPLIED TO THE LOAD (OUTPUT VOLTAGE) |
| I | LOAD CURRENT |

| $E_2$ | FILTER INPUT-SIDE VOLTAGE (INVERTER INTERNAL VOLTAGE) ON THE SIDE OF INV.2 |
|---|---|
| $E_{L2}$ | VOLTAGE APPLIED TO THE FILTER ON THE SIDE OF INV.2 |
| $I_2$ | OUTPUT CURRENT ON THE SIDE OF INV.2 |
| $\theta_2$ | PHASE DIFFERENCE BETWEEN $E_2$ AND V |
| $Z_{L2}$ | IMPEDANCE OF THE FILTER ON THE SIDE OF INV.2 |
| $X_{L2}$ | REACTANCE COMPONENT OF THE FILTER ON THE SIDE OF INV.2 |
| $R_{L2}$ | RESISTANCE COMPONENT OF THE FILTER ON THE SIDE OF INV.2 |
| $\phi_2$ | PHASE DIFFERENCE BETWEEN $E_2$ AND $I_2$ |

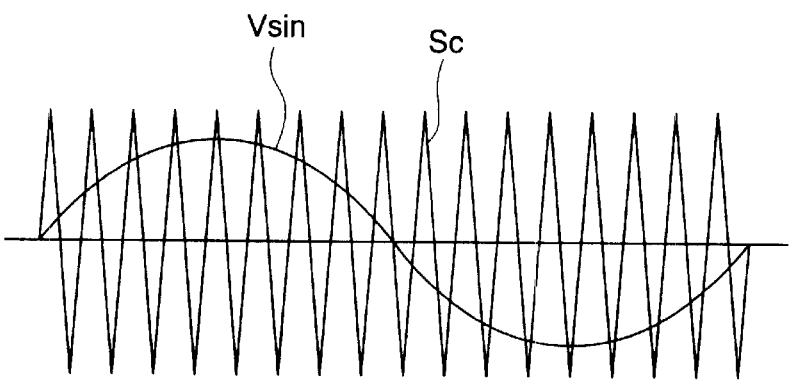
FIG. 11a
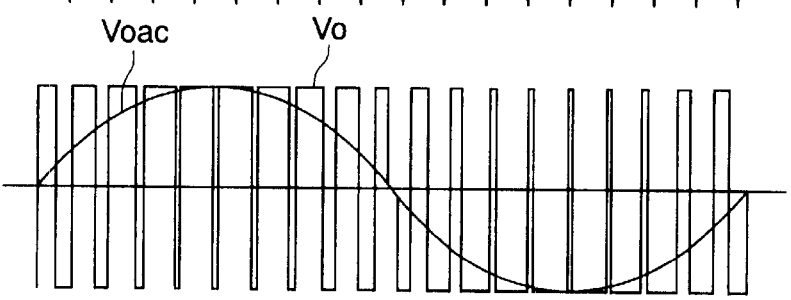
FIG. 11b
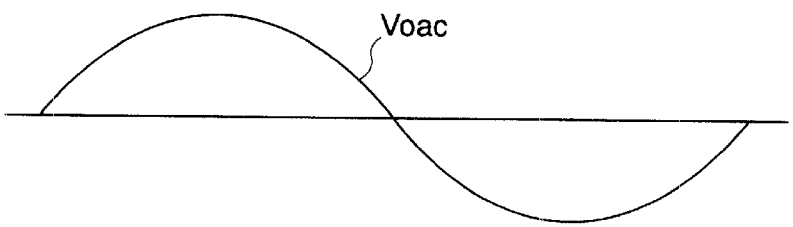
FIG. 11c
FIG. 12
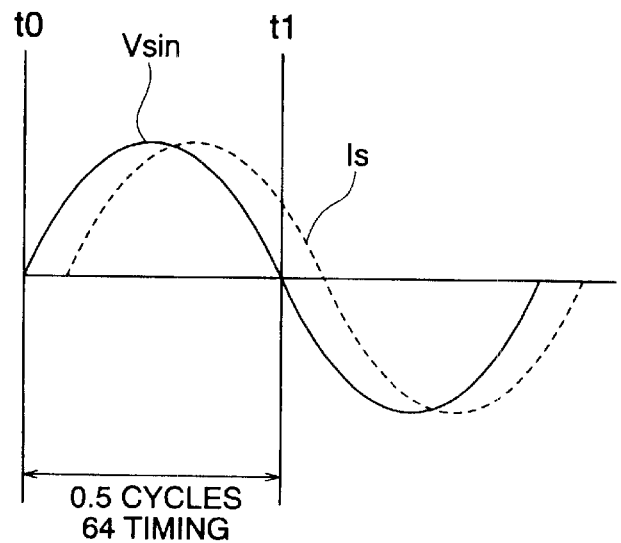

BALANCING PARALLEL INVERTER SYSTEMS

BACKGROUND OF THE INVENTION

1. FIELD OF THE INVENTION

The present invention relates to an inverter parallel operation system in which a balance is maintained among effective powers output by inverters under parallel operation, and load distribution among the inverters under parallel operation is accomplished by controlling in such a manner that the output frequencies of the inverters under parallel operation is caused to agree with frequencies predetermined in accordance with the output effective power from each or any one of the inverter.

2. DESCRIPTION OF THE PRIOR ART

Inverters that are operated in parallel are publicly known, and Japanese Patent Publication No. 2678991 and Japanese Published Unexamined Patent Application No. 2000-32764, for example, disclosed the art of balancing effective powers among inverters under parallel operation.

These prior-arts are based on the fact that output effective powers can be controlled by advancing or lagging the frequency (phase) thereof.

These prior arts, however, take no account of balancing output reactive powers among inverters under parallel operation.

The aforementioned Japanese patent Publication No. 2678991 and Japanese Published Unexamined Patent Application No. 2000-32764 disclosed that effective powers are balanced among the inverters so as to eliminate unwanted cross-current powers among the inverters under parallel operation.

To eliminate the aforementioned cross-current power, it is necessary to accurately grasp the state of generation of cross-current power. That is, how to grasp the generation of cross-current power is of critical importance.

FIG. 26 is a circuit diagram of a system where two inverters are in parallel operation.

Numerals 122A and 122B in the figure refer to a-c generators, 133A and 133B to rectifier circuits with input voltages $V_A$ and $V_B$, 134A and 134B to smoothing capacitors, 135A and 135B, and 136A and 136B to output terminals, respectively, 137A and 137B to inverters or inverter circuits with input voltages $V_A$ and $V_B$, 138A and 138B to filter circuits, and F to a common load, respectively.

FIG. 27 is an equivalent circuit diagram in which only cross-currents in the circuit configuration of FIG. 26 are taken into account. Assuming that an effective power output by an inverter (137A) is $P_A$, $$P_A \cong \frac{E_1^2}{4(r_1^2 + x_1^2)}\{2x_1(\theta_1 - \theta_2) + 2r_1(E_1 - E_2)\}$$

where $r_1 = r_2$, and $x_1 = x_2$. When the phase difference between internal voltages is assumed to be $\theta_1 - \theta_2 = 0$, $$P_A \cong \frac{2r_1(E_1 - E_2) \cdot E_1^2}{4(r_1^2 + x_1^2)} = \frac{r_1 \cdot E_1^2}{2(r_1^2 + x_1^2)}(E_1 - E_2),$$

and when $E_2 > E_1$, PA takes a negative value. That is, a cross-current power is allowed to flow in the inverter 137A. The cross-current power flowing in the inverter 137A is returned to the input side of an H bridge comprising the inverter, charging the smoothing capacitor 134A connected to the input side of the H bridge to raise the terminal voltage of the smoothing capacitor 134A. The cross-current power flowing in the inverter 137A is not returned to the generator side. For this reason, the terminal voltage of the smoothing capacitor 134A continues to increase. This terminal voltage V becomes a voltage V determined by $$E_N = \tfrac{1}{2}CV^2 = J + \tfrac{1}{2}CV_0^2 \quad J = \int(-P_A)dt$$

where $E_N$: Energy

J: Amount of inflow power

C: Capacitance of the smoothing capacitor

V: Terminal voltage across the smoothing capacitor $V_0$: Initial value.

As the terminal voltage V of the smoothing capacitor 134A rises, the input voltage of the H bridge of the inverter 137A rises. As will be described later, however, the internal voltage $E_1$ of the inverter 137A is fixed at a value determined by a sine-wave standard signal $V_{sin}$. in the PWM circuit which will be described later. Furthermore, raising the output voltage (which can be considered the internal voltage $E_1$) means that control is performed to increase the amplitude of the sine-wave standard signal $V_{sin}$.

Since the presence of a cross-current power causes the terminal voltages of the smoothing capacitors 134A and 134B to unwantedly increase, as described above, it is necessary to inhibit the increase.

In the configuration shown in FIG. 26, the inverter circuits 137A and 137B on each side output high-frequency alternating voltages of a so-called square waveform as switching control is accomplished by on-off signals from the PWM circuit (not shown). The filter circuit 138A (the same applies to the filter circuit 138B) comprises two choke coils across the terminals 153A and 135A, and across the terminals 154A and 136A, and a capacitor across the terminal 135A and 136A, for example. Needless to say, the filter circuit 138A filters the high-frequency alternating voltage of a square waveform output by the inverter circuit 137A, and works in such a manner as to direct a desired sine-wave voltage of 50 Hz, for example, to the load.

In each inverter device as shown in FIG. 26, an output voltage (internal voltage) or output current of its own is extracted due to the need for detecting the power generated by itself.

In such a case, particularly when extracting the output voltage, various contrivances have to be worked out to cope with the effects of the high-frequency alternating voltage of a square waveform generated by the inverter device or the effects of the noise voltage introduced from the load.

FIG. 28 shows an example of conventional methods of drawing potentials. FIG. 29 shows an example of the method of drawing potentials disclosed in Japanese Patent Publication No. 2688660. Like numerals in each figure correspond to those used in FIG. 26.

In FIGS. 28 and 29, two choke coils are provided because there are two types of high frequencies and noises passing through the filter circuits (hereinafter referred to collectively as noises); noises a and b recirculating into the filter circuit 138A in an opposite phase, and noises c and d flowing in the filter circuit 138A in the same phase. The two choke coils are designed to inhibit both types of noises.

In the configuration shown in FIG. 28, a potential on the terminal 135A of a choke coil connected between the terminals 153A and 135A and a potential on the terminal 136A of the choke coil connected between the terminal 154A and 136A are introduced to a differential amplifier A where the output voltage of the inverter circuit is extracted as a difference between the two potentials.

In the configuration shown in FIG. 29, a potential on the terminal 153A of a choke coil connected between the terminals 153A and 135A and a potential on the terminal 154A of the choke coil connected between the terminal 154A and 136A are introduced to a differential amplifier A where the output voltage of the inverter circuit is extracted as a difference between the two potentials.

The configurations shown in FIGS. 28 and 29 have their advantages and disadvantages. In the configuration shown in FIG. 2, noises caused by high-frequency components from the inverter circuit can be easily suppressed, while noises from the load side are led to the input side of the differential amplifier. In some cases, therefore, an additional filter circuit may have to be added to the load side of the terminals 135A and 136A in FIG. 28, or on the input side of the differential amplifier.

In the configuration shown in FIG. 29, noises from the load side can be easily suppressed, but those from the inverter circuit side tend to be left intact. Furthermore, the presence of choke coils may cause a phase shift in the original output voltage (original sine-wave voltage) in the inverter circuit.

SUMMARY OF THE INVENTION

It is an object of the present invention to provide an inverter parallel operation system in which both the output effective power and output reactive power of inverters under parallel operation are balanced.

It is another object of the present invention to provide an inverter parallel operation system in which output reactive powers are balanced at all times among the inverters under parallel operation.

It is a further object of the present invention to provide an inverter parallel operation system in which the load sharing ratio of output effective power to be borne by each inverter can be determined appropriately among the inverters under parallel operation, even with the prior-art technology.

It is still a further object of the present invention to provide an inverter parallel operation system in which control is effected in such a manner as to increase the internal voltage of an inverter by detecting the presence of cross-current, thereby inhibiting the generation of unwanted cross-current.

It is still a further object of the present invention to provide a potential drawing circuit for minimizing possible effects of noises when bringing in the output voltage of an inverter circuit.

In disclosed embodiments, a first inverter is adapted to control the output frequency thereof by controlling control elements comprising the inverter, and a second inverter and subsequent inverters are adapted to control the output frequencies thereof by controlling control elements comprising the inverters, and power is fed to a common load after a choke coil provided on the output end of a first filter provided on the output side of the first inverter has been connected to a choke coil provided on the output end of a second filter provided on the output side of the second and subsequent inverters; the improvement comprising controlling effective powers generated by the first and second and subsequent inverters by detecting effective powers output by the fist inverter and/or the second and subsequent inverters, and controlling any one or both of output frequencies predetermined in accordance with the effective powers.

BRIEF DESCRIPTION OF THE DRAWINGS

FIG. 3 is a diagram enumerating symbols relating to FIG. 2.

FIGS. 11(*a*), 11(*b*), and 11(*c*) shows waveforms at various portions in FIG. 10.

FIG. 12 is a waveform diagram showing a sine wave reference signal and a detected output current.

DETAILED DESCRIPTION OF PREFERRED EMBODIMENTS

Figure 1:
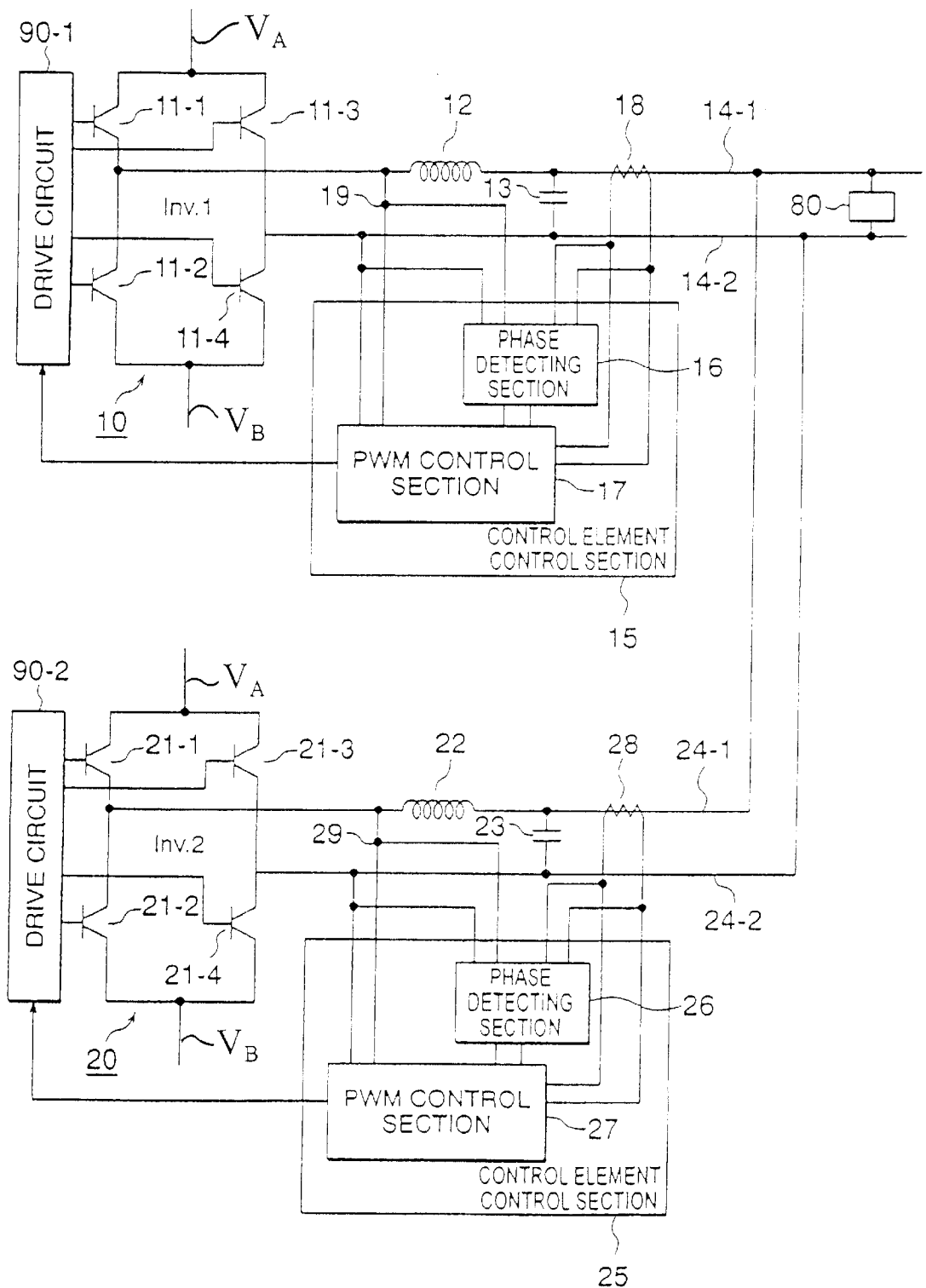
FIG. 1 is a diagram showing an embodiment of the present invention.

FIG. 1 is a circuit diagram showing an embodiment of the present invention where two inverters are under parallel operation.

In the figure, reference numerals 10 and 20 refer to inverters with input voltages $V_A$ and $V_B$, 11-i and 21-i to control elements, 12 and 22 to choke coils (filters), 13 and 23 to capacitors (filters), 14-i and 24-i to output ends of the filters, 15 and 25 to control sections of control elements, 16 and 26 to phase detecting sections, 17 and 27 to PWM control sections, 18 and 28 to output current detecting means, 19 and 29 to internal voltage detecting means, 80 to a common load, and 90-I to a drive circuit, respectively.

The inverters 10 and 20 generate a desired output voltage at a desired frequency (phase), as is well known, by applying a pulse-width modulated control signal (PWM control signal) to the control terminals (gates or bases of transistors, for example) of the control elements 11-i and 21-i via the control element control sections 15 and 25, and the drive circuits 90-1 and 90-2. The output is fed to the load 80 via a filter comprising a choke coil (12 or 22) and capacitor (13 or 23).

The pulse-width modulated control signal is a square-wave signal whose duty ratio and period are made variable. In the control to equalize effective power, the period of the control signal is controlled. In the control to equalize reactive power according to the present invention, the duty ratio of the control signal is controlled.

Figure 4:
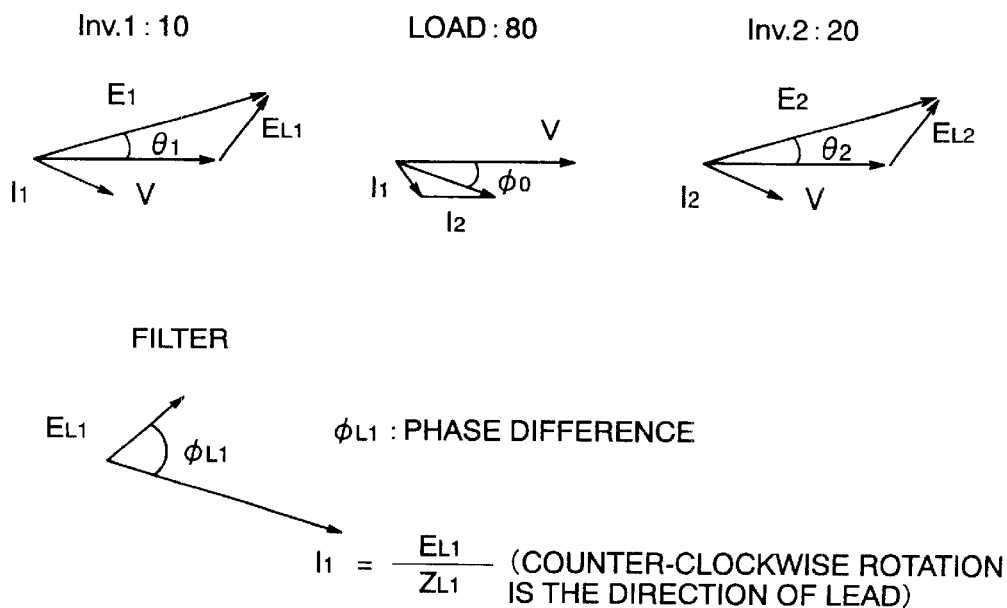
FIG. 4 is a vector diagram of the inverter filter.
Figure 15A:
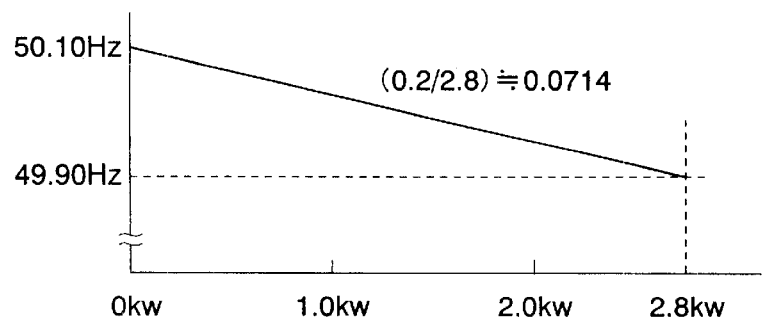
FIGS. 15(*a*), 15(*b*-1), 15(*b*-2) and 15(*c*) is a diagram showing the relationship between effective power and frequency to explain frequency control.
Figures 1, 15B:
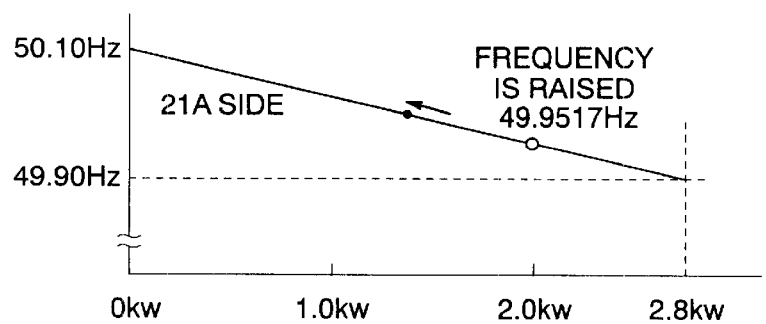
Figures 2, 15B:
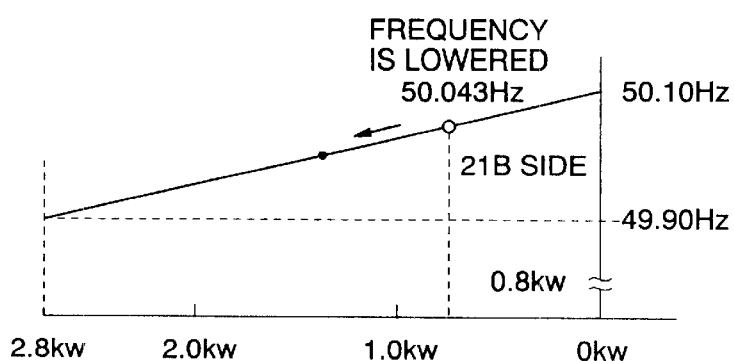
FIG. 2 is a diagram showing a simplified equivalent circuit of the inverter system shown in FIG. 1.

Next, the state of inverter parallel operation will be analyzed, referring to FIGS. 2 through 4.

FIG. 2 shows a simplified equivalent circuit of the inverter shown in FIG. 1. Numerals 10, 20, 14, 24 and 80 in the figure correspond to like numerals in FIG. 1. That is, the first inverter 10 and the second inverter 20 feed power to the common load 80 to which the output ends 14 and 24, respectively, of the filters are connected.

FIG. 3 is a diagram enumerating symbols relating to FIG. 2. E1 and E2, for example, represent input voltages (internal voltages of the inverter) to the filter on the side of the inverter 10 or 20, and EL1 and EL2 represent voltages applied to the filters, FIG. 4 is a vector diagram showing vectors in the inverter 10, the load 80, the inverter 20 and the filter on the side of the inverter 10.

An equation can be set up on the basis of V.

$$\dot{E}_1 = E_1 \cos\theta_1 + jE_1\sin\theta_1 \ (j = \sqrt{-1})$$

Since $\dot{e}_1[\text{rad}] < 1$, $\cos \dot{e}_1 \approx 1$, and $\sin \dot{e}_1 \approx \dot{e}_1$, and therefore $\dot{E}_1 = E_1 + jE_1\theta_1$ $$\dot{I}_1 = \frac{\dot{E}_1 - V}{\dot{Z}_{LI}} = \frac{E_1 - V + jE_1\theta_1}{R_1 + jX_{LI}}$$

-continued
$$= \frac{X_{LI}}{|Z_{LI}|^2}\{E_1\theta_1 - j(E_1 - V)\} + \frac{R_1}{|Z_{LI}|^2}\{(E_1 - V) + jE_1\theta_1\}$$
$$= \frac{X_{LI}E_1\theta_1 + R_1(E_1 - V)}{|Z_{LI}|^2} - j\frac{X_{LI}(E_1 - V) - R_1E_1\theta_1}{|Z_{LI}|^2}$$

Assuming that the conjugate complex number of $\dot{I}_1$ is $\bar{I}_1$, $$\bar{I}_1 = \frac{X_{LI}E_1\theta_1 + R_1(E_1 - V)}{|Z_{LI}|^2} + j\frac{X_{LI}(E_1 - V) - R_1E_1\theta_1}{|Z_{LI}|^2}$$

Assuming that the effective power supplied by the inverter 10 is $P_1$, the reactive power thereof is $Q_1$, and the lagged reactive power has a positive sign, $$P + jQ_1 = V\bar{I}_1$$
$$= \frac{VE_1X_{LI}\theta_1 + VR_1(E_1 - V)}{|Z_{LI}|^2} + j\frac{VX_{LI}(E_1 - V) - VE_1R_1\theta_1}{|Z_{LI}|^2}$$

Similarly, assuming that the effective power supplied by the inverter 20 is $P_2$, and the reactive power thereof is $Q_2$, $$P_2 + jQ_2 = V\bar{I}_2$$
$$= \frac{VE_2X_{L2}\theta_2 + VR_2(E_2 - V)}{|Z_{L2}|^2} + j\frac{VX_{L2}(E_2 - V) - VE_2R_2\theta_2}{|Z_{L2}|^2}$$

The difference $P_2 - P_1$ of the effective powers supplied by the inverters 20 and 10 can be obtained by the following equation.

$$P_2 - P_1 = \frac{VE_2X_{L2}\theta_2 + VR_2(E_2 - V)}{|Z_{L2}|^2} - \frac{VE_1X_{LI}\theta_1 + VR_1(E_1 - V)}{|Z_{LI}|^2}$$
$$= \frac{VE_2X_{L2}}{|Z_{L2}|^2}\theta_2 - \frac{VE_1X_{LI}}{|Z_{LI}|^2}\theta_1 + \frac{VR_2}{|Z_{L2}|^2}(E_2 - V) - \frac{VR_1}{|Z_{LI}|^2}(E_1 - V).$$

Since the inverters 10 and 20 are of the same type, $X_{L1} \approx X_{L2}$, $R_1 \approx R_2$, and $Z_{L1} \approx Z_{L2}$. Moreover, since both $E_{L1}$ and $E_{L2}$ are small values, $E_1 \approx E_2 \approx V$, and is an almost constant value. If $$\frac{E_2}{|Z_{L2}|} \approx \frac{E_1}{|Z_{LI}|} \equiv I_S$$
$$\frac{X_{L2}}{|Z_{L2}|} \approx \frac{X_{LI}}{|Z_{LI}|} \equiv \sin\phi_L, \ \frac{R_2}{|Z_{L2}|} \approx \frac{R_1}{|Z_{LI}|} \equiv \cos\phi_L, \text{ then}$$
$$\frac{VE_2X_{L2}}{|Z_{L2}|^2} = \frac{VE_1X_{LI}}{|Z_{LI}|^2} \approx VI_S\sin\phi_L, \ \frac{VR_2}{|Z_{L2}|^2} \approx \frac{VR_1}{|Z_{LI}|^2} \approx VI_S\cos\phi_L$$
$$VI_S \approx \text{const.}$$
$$P_2 - P_1 \approx VI_S\{(\theta_2 - \theta_1)\sin\phi_L + (E_2 - E_1)\cos\phi_L\}$$

Similarly, the difference $Q_2 - Q_1$ of the reactive powers supplied by the inverters 20 and 10 can be obtained by the following equation.

$$\theta_2 - \theta_1 = -\left\{\frac{VE_2R_2}{|Z_{L2}|^2}\theta_2 - \frac{VE_1R_1}{|Z_{LI}|^2}\theta_1\right\} + \frac{VX_{L2}}{|Z_{L2}|^2}(E_2 - V) - \frac{VX_{LI}}{|Z_{LI}|^2}(E_1 - V)$$
$$Q_2 - Q_1 \approx VI_S\{(E_2 - E_1)\sin\phi_L - (\theta_2 - \theta_1)\cos\phi_L\}.$$

Now, the power balance among the inverters under parallel operation where only the phase is controlled, as in the case of the prior art, will be examined in the following.

The phase control of inverters is carried out by minutely changing the frequency. That is, the phase advances with increases in the frequency, and the phase lags with decreases in the frequency.

Figure 5:
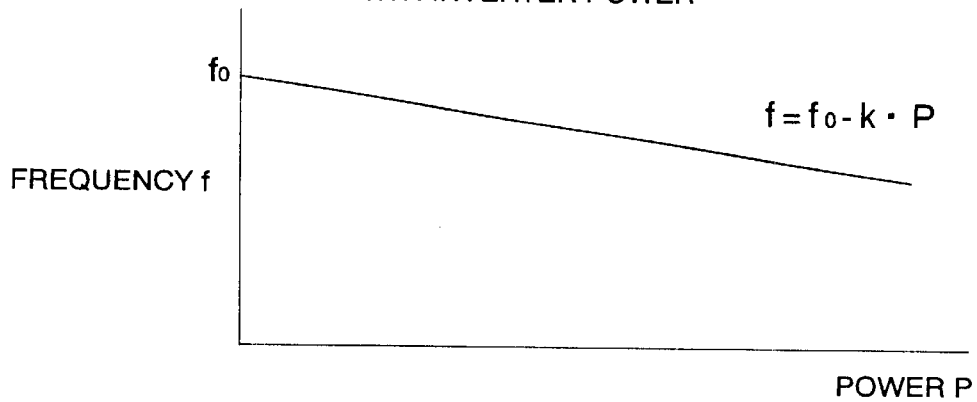
FIG. 5 is a diagram showing the relationship between output effective power P and frequency f.

FIG. 5 is a diagram showing the relationship between the output effective power P and the frequency f. The relationship between both can be expressed by the equation;

$$f = f_0 - k \cdot P.$$

The output effective power P varies by controlling the frequency f.

Since the stability condition for the parallel operation of the inverter is that the frequencies of all the inverters become equal, the parallel operation is stabilized at a given frequency f.

Figure 6:
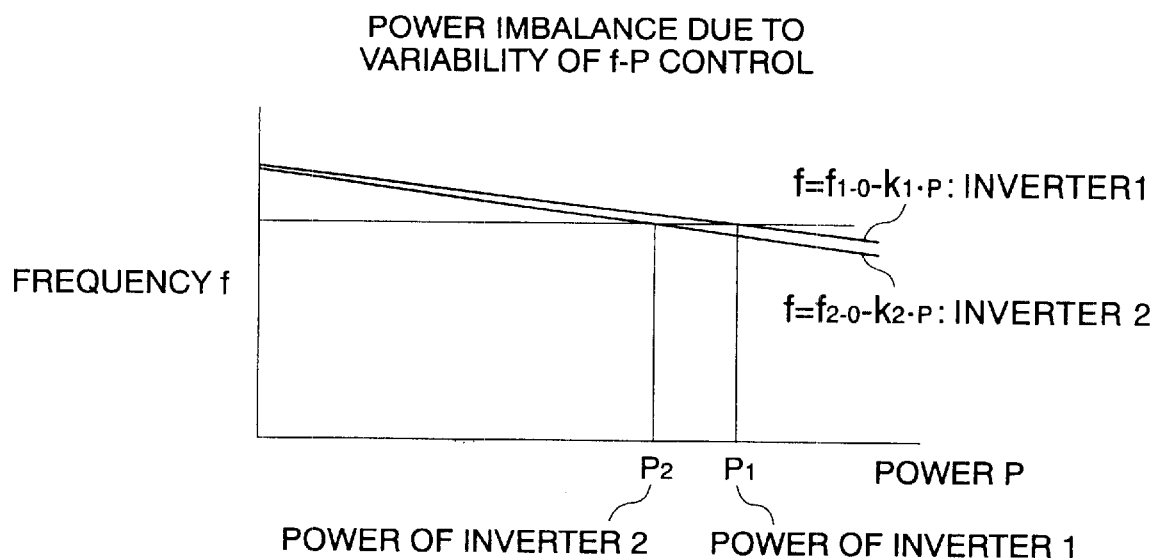
FIG. 6 is a diagram of assistance in explaining effective power output by each inverter.

Consequently, the effective powers P1 and P2 as given by $$f = f_0 - k \cdot P$$

are output by each inverter at that time, as shown in FIG. 6. Thus, the equalization of effective powers among the inverters is accomplished by carrying out the control to slightly change the frequencies of the inverters under the f-P relationship.

In the following, if the resistance of the filter is disregarded for the sake of simplicity, $\phi L = 90°$, and $$P_2 - P_1 = VI_S(\theta_2 - \theta_1) \quad (1)$$

$$Q_2 - Q_1 = VI_S(E_2 - E_1) \quad (2)$$

Ideally, both Equations (1) and (2) should become zero. Control is effected so that the $(P_2-P_1)$ value becomes zero by controlling the frequency f of any one or both of the inverters, as described with reference to FIG. 6.

The $(Q_2-Q_1)$ value, on the other hand, cannot be controlled merely by controlling the frequency f. As a result, unwanted reactive current could flow between the inverters in the prior art.

The present invention is intended to control the output reactive power Q corresponding to this reactive current so that the $(Q_2-Q_1)$ value becomes zero.

From Equation (2), when $E_2 > E_1$, the reactive power lagging behind $E_2$ is increased if the difference $E_2-E_1$ is large, whereas the reactive power lagging behind $E_2$ is reduced if the difference $E_2-E_1$ is small.

When $E_2 < E_1$, the reactive power advancing from $E_2$ is increased if the $E_2-E_1$ value is large, whereas the reactive power advancing from $E_2$ is reduced if the $E_2-E_1$ value is small.

Consequently, the reactive power difference can be brought close to zero by controlling the internal voltage difference.

Assuming that the reactive power flowing in the load is $Q_0$, $Q_2 + Q_1 = Q_0$ Since $Q_2 - Q_1 = VI_S(E_2 - E_1)$ in Equation (2), $$Q_2 = \frac{Q_0}{2} + \frac{VI_S(E_2 - E_1)}{2}$$

$$Q_1 = \frac{Q_0}{2} + \frac{VI_S(E_1 - E_2)}{2}$$

Consequently, when $E_2 - E_1 \equiv 2\Delta E$, the reactive powers $I_{q1}$ (reactive current of inverter 10), and $I_{q2}$ (reactive current of inverter 20) are $$I_{q1} = \frac{Q_0}{2V} + \frac{I_S(E_1 - E_2)}{2} = \frac{Q_0}{2V} - I_S \Delta E$$

$$I_{q2} = \frac{Q_0}{2V} + \frac{I_S(E_2 - E_1)}{2} = \frac{Q_0}{2V} + I_S \Delta E.$$

When the voltage of one inverter is low, the current flows more on the lead side, and when the voltage of its own inverter is high, the current flows more on the lag side. Eyeing this fact, the internal voltage of any one or both of the inverters is controlled so as to minimize the voltage difference $\Delta E$.

Figure 7:
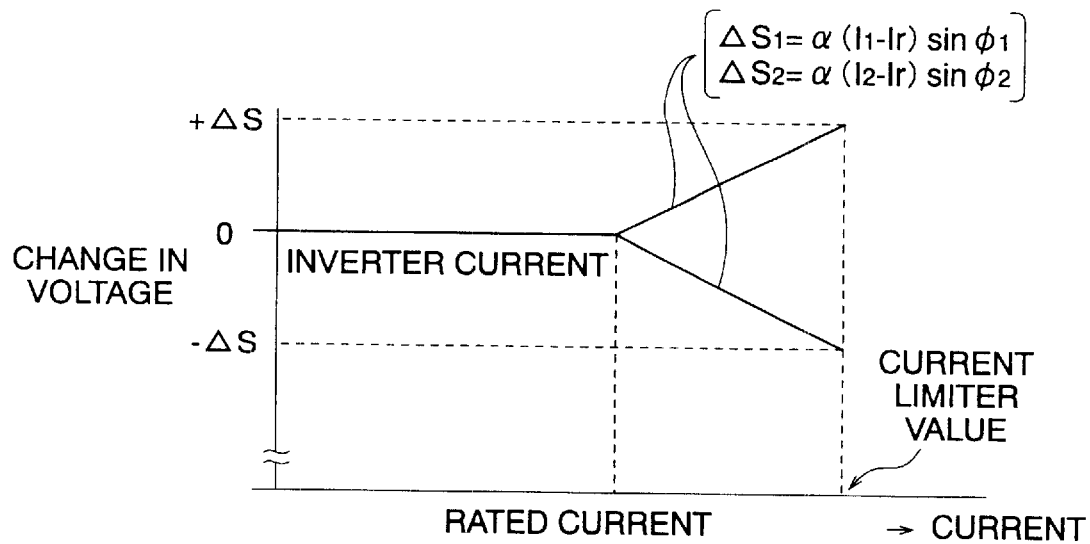
FIG. 7 is a diagram showing the state where the output current of the inverter according to the present invention is controlled.

FIG. 7 shows the state where the output current of the inverter according to the present invention is controlled.

The control of the inverter internal voltage $E_1$ or $E_2$ is not carried out so long as the inverter current $I_1$ or $I_2$ does not exceed the rated current Ir. When the inverter current $I_1$ or $I_2$ exceeds the rated current $I_r$, control is performed so that the internal voltage $E_1$ or $E_2$ of the inverter becomes $E_1+\Delta S_1$ ($\Delta S_1$ becomes a positive or negative number.)

$S_2+\Delta E_2$ ($\Delta S_2$ becomes a positive or negative number.)

based on the following equations.

$\Delta S_1 = \alpha(I_1-I_r)\sin \phi_1$, or $\Delta S_2 = \alpha(I_2-I_r)\sin \phi_2$ where $\alpha$ is a positive coefficient, $\phi_1$ is the phase difference between $E_1$ and $I_1$, $\phi_2$ is the phase difference between $E_2$ and $I_2$.

As for $\phi 1$ or $\phi_2$, the phase difference between the output voltage V and the output current $I_1$ or $I_2$ of the inverter can be used if $E_1 \approx V \approx E_2$.

In FIG. 7, Ir is defined as the rated current, but it may be any current value so long as it is within the range that does not exceed the current limiter value. In the following, $I_r'$ will be used in place of $I_r$. That is, control can be performed based on the following equation.

$\Delta S_1 = \alpha(I_r-I_r')\sin \phi_1$, or $\Delta S_2 = \alpha(I_r-I_r')\sin \phi_2$.

Furthermore, values such as $\phi_1$ and $\phi_2$ may generally be used as sin $\phi_1$ and sin $\phi_2$ as they are. Control can therefore be performed based on the following equation.

$\Delta S_1 = \alpha(I_r-I_r')\sin \phi_1$, or $\Delta S_2 = \alpha(I_r-I_r')\sin \phi_2$.

Where the absolute value of sin $\phi_1$ or sin $\phi_2$, or $\phi_1$ or $\phi_2$ is less than a predetermined value, sin $\phi_1$ or sin $\phi_2$, or $\phi_1$ or $\phi_2$ may be used as it is, and where the absolute value of sin $\phi_1$ or sin $\phi_2$, or $\phi_1$ or $\phi_2$ is more than the predetermined value, the value of sin $\phi_1$ or sin $\phi_2$, or $\phi_1$ or $\phi_2$ at that predetermined value may be used as a fixed value, instead of using sin $\phi_1$ or sin $\phi_2$, or $\phi_1$ or $\phi_2$, as described above.

In FIG. 7, description has been made on the assumption that the coefficient a is the same value both in the case of the control toward the $+\Delta S_1$ side and in the case of the control toward the $-\Delta S_1$ side. The size of coefficient a, however, may be different, depending on the side toward which control is performed. In general, it is desirable to weaken the degree of control to increase the internal voltage in the case of the control toward the $+\Delta S_1$ side because the control toward the $+\Delta S_1$ represent the direction in which the internal voltage is increased. When the coefficient on the $+\Delta S_1$ side is a $\alpha_1$ and the coefficient on the $-\Delta S_1$ side is $\alpha_2$, therefore, it is recommended that $$\alpha_1 < \alpha_2.$$

Furthermore, where it is not desirable to perform the control to increase the inverter internal voltage $E_1$ or $E_2$, control can be performed only when $\Delta S_1$ or $\Delta S_2$ is a negative value. On the contrary, where it is not desirable to perform the control to reduce the inverter internal voltage $E_1$ or $E_2$, control can be performed only when $\Delta S_1$ or $\Delta S_2$ is a positive value. Needless to say, an arrangement can be made where the aforementioned control is performed, regardless of whether $\Delta S_1$ or $\Delta S_2$ is positive or negative.

Moreover, upper and lower limits can be set for $\Delta S_1$ or $\Delta S_2$, and needless to say, both of upper and lower limits can be set for them. In this case, once the upper limit or the lower limit is reached, any control exceeding that value is inhibited.

A phase detecting section 16 (26) shown in FIG. 1 detects the phase difference $\phi_1(\phi_2)$ between voltage $E_1(E_2)$ and output current $I_1(I_2)$ to supply to a PWM control section 17 (27). The PWM control section 17 (27) receives the voltage $E_1(E_2)$, the output current $I_1(I_2)$ and the phase difference $\phi_1(\phi_2)$, and generates the aforementioned PWM control signal. Needless to say, information is exchanged between the PWM control section 17 and the PWM control section 27 as necessary.

From the above description it will be apparent that not only effective powers but reactive powers can be equalized when feeding power to a common load through the parallel operation of a plurality of inverters.

In the aforementioned description, the current value $I_r'$ is assumed to be a value that can be set arbitrarily. It should be noted, however, that control is effected in the case of the aforementioned description only when the inverter current $I_1$ or $I_2$ exceeds the current value $I_r$. This means, therefore, that control cannot be effected so as to prevent reactive current from flowing as a cross-current within the range where the inverter current $I_1$ or $I_2$ does not exceed the current value $I_r'$.

In another embodiment of the present invention, control is accomplished based of the following principle, without resorting to the method of setting the aforementioned current value $I_r'$.

A) The presence of a difference in the output voltage (internal voltage) among inverters may cause an unwanted cross-current in reactive powers, leading to an imbalance in reactive powers among the inverters.

B) A change in the output voltage (internal voltage) of an inverter may generally cause the current (or power) to be output (or input) by the counterpart inverter to change in synchronism with the change in the output voltage.

C) If the reactive currents of inverters are the same with each other, small variations in output voltage (internal voltage) of the inverters become equal. This offsets the change in inverter output currents, indicating that their reactive powers are balanced.

D) When it is assumed that the output voltage (internal voltage) of the inverter on the A side is changed by $\beta$, volts, for example, and that the output voltage (internal voltage) of the inverter on the B side is changed by a volts, for example, a change is caused in the output current of the inverter on the B side (the same applied to the inverter on the A side) in accordance with $\alpha$-$\beta$. This is attributable to a cross-current produced due to the temporary generation of a difference in output voltage (internal voltage) between the two inverters.

E) Under the circumstance of (D) above, the inverter on the B side can the state of reactive current (reactive power) in the inverter on the A side by knowing whether the output current of the inverter on the B side has increased or decreased, and how much is the absolute value of the change. Based on the findings, the inverter on the B side can know the direction of control to increase or decrease the present output voltage (internal voltage) to eliminate the cross-current.

EMBODIMENT 1

Assuming that only inverters A and B are under parallel operation, the processing of the inverter A will be described in the following.

Figure 8:
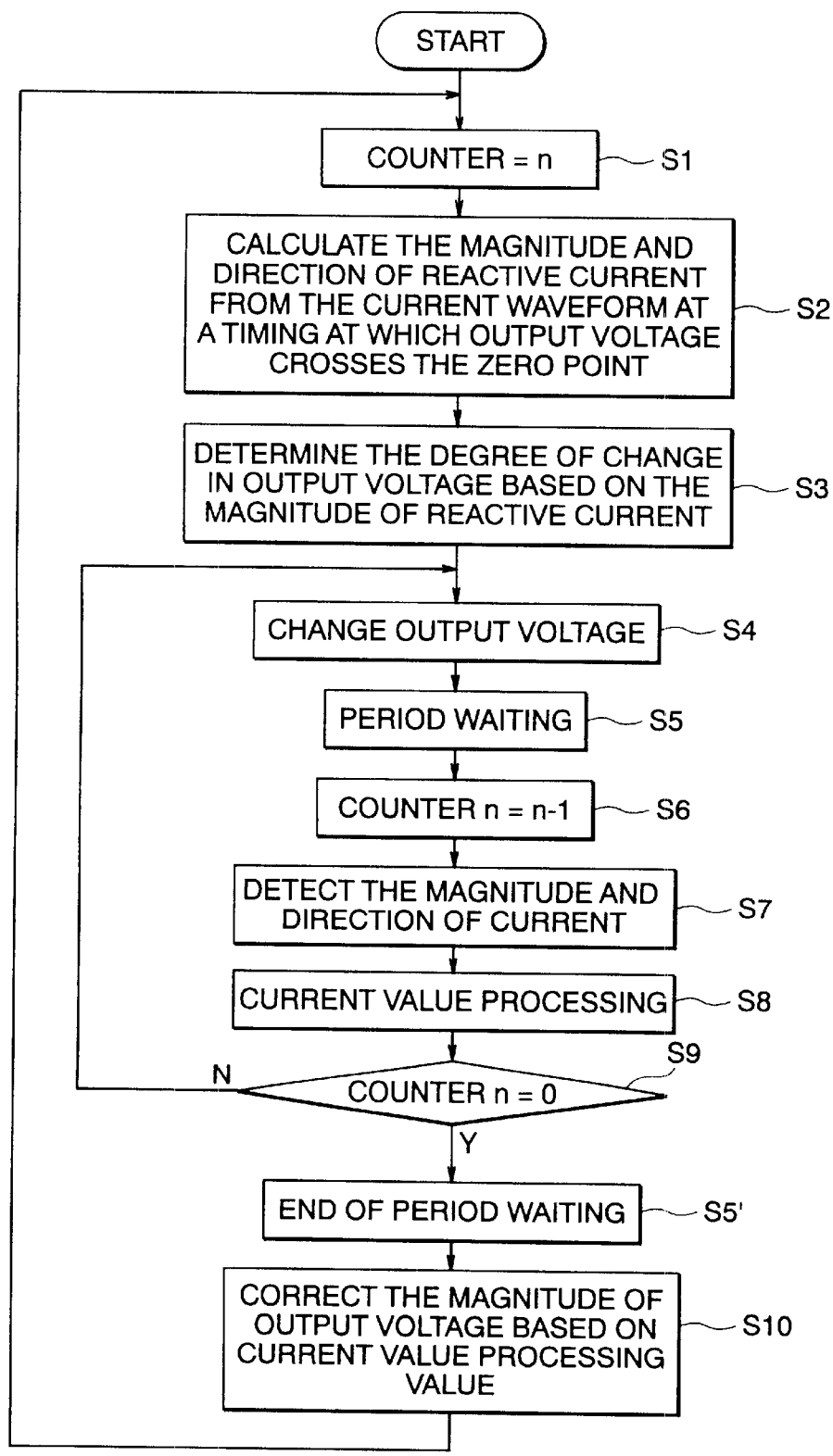
FIG. 8 is a flow chart corresponding to Embodiment 1 of the present invention.

FIG. 8 is a flow chart corresponding to Embodiment 1.
STEP S1: Preset the counter value to n.
STEP S2: Detect the magnitude and direction of the reactive current of the inverter from the current waveform at a timing at which the output voltage crosses the zero point.
STEP S3: Determine the degree of minute-level change in output voltage in accordance with the absolute value of the reactive current.
STEP S4: Change the output voltage.
STEP S5: Start waiting for a predetermined period T.
STEP S6: Change the counter value to n-1.
STEP S7: Detect the magnitude (absolute value) and direction of the inverter output current at the timing at which the output voltage was changed.
STEP S8: Study the present state of the difference in reactive current based on the magnitude and direction of the detected inverter output current.
STEP S9: Repeat STEPS S4 through S8 until the counter value becomes zero.
STEP S5': Completion of waiting for a period.
STEP S10: Change (correct) the magnitude of output voltage based on the information obtained in STEP S8 so as to eliminate the difference in reactive current.

EMBODIMENT 2

Figure 9:
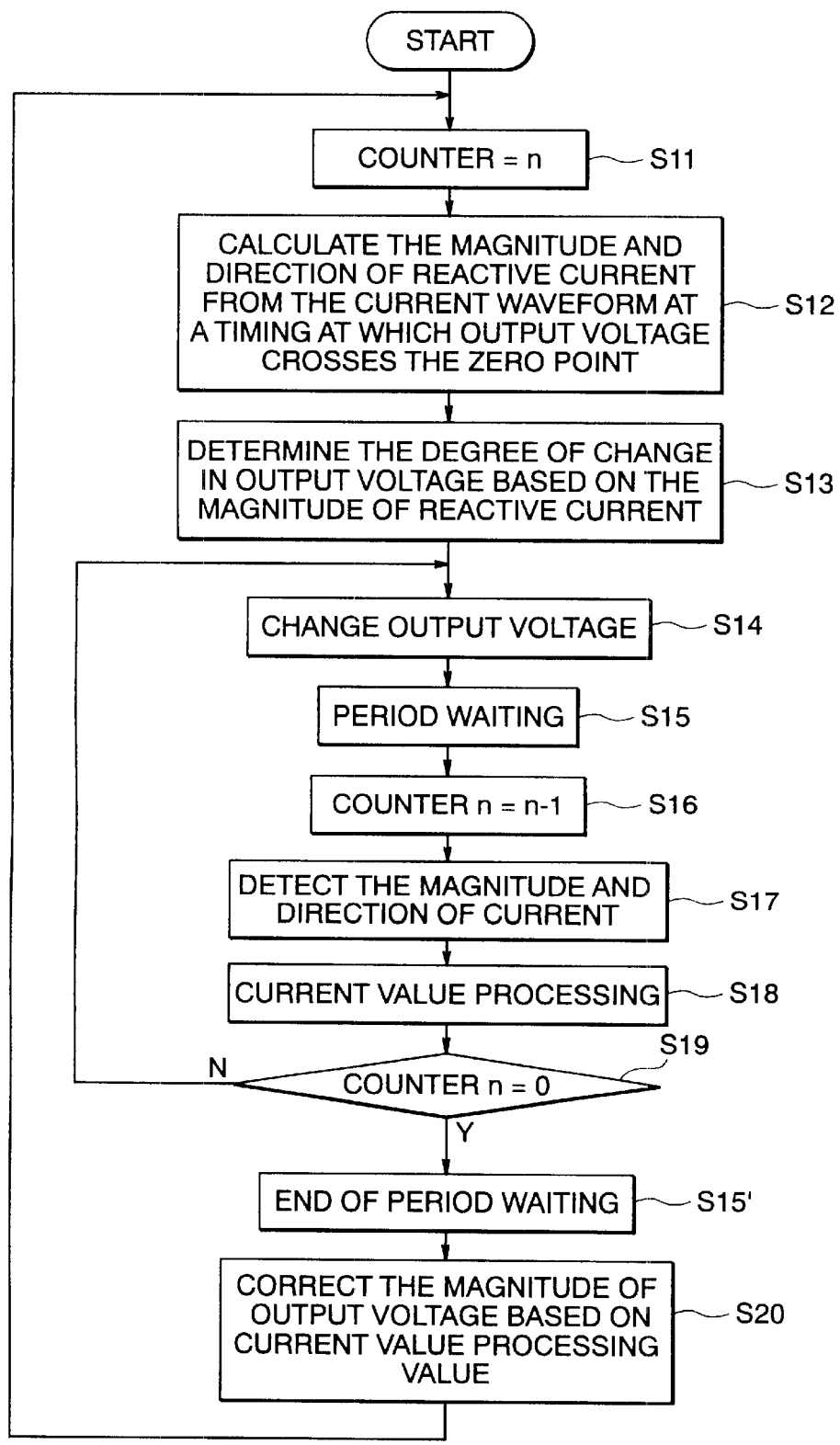
FIG. 9 is a flow chart corresponding to Embodiment 2 of the present invention.

FIG. 9 is a flow chart corresponding to Embodiment 2.
This case differs from Embodiment 1 in that the period in which the output voltage is changed is caused to change.
STEP S11: Preset the counter value to n.
STEP S12: Detect the magnitude and direction of reactive current from the current waveform at the timing at which the output voltage crosses the zero point.
STEP S13: Determine the magnitude of minute-level change in the output voltage based on the magnitude corresponding to the absolute value of the reactive current, and determine which of the first period or the second period be adopted based on the direction corresponding to the absolute value of the reactive current. If the direction is positive, that is, the direction in which reactive current is output from the inverter, select the period $T_1$, and if the direction is negative, that is, the direction in which reactive current is input into the inverter, select the period $T_2$.
STEP S14: Change the output voltage.
STEP S15: Start waiting for a predetermined period $T_1$ or $T_2$.
STEP S16: Change the counter value to n-1.
STEP S17: Defect the magnitude (absolute value) and direction of the inverter output current at the timing at which the output voltage is changed.
STEP S18: Examine the present state of the reactive current difference based on the magnitude and direction of the detected inverter output current.

STEP S19: Repeat STEPS S14 through S18 until the counter value becomes zero.
STEP S15': Completion of waiting for a period.
STEP S20: Change (correct) the magnitude of output voltage based on the information obtained in STEP S18 so as to eliminate the difference in reactive current.

The preset counter value n may be a natural number (n=1, 2, 3, . . . ).

PREPROCESSING FOR CONTROL OF THE PRESENT INVENTION

In the foregoing, description has been made on the control mode for cross-current prevention according to the present invention. It is desired that the following operations be carried out before the control mode is started after the start of the inverters.

Since no information is available on the counterpart inverter immediately after the start of one inverter, the difference in internal voltage between the inverters cannot be eliminated, and even when a large reactive current is detected, whether it is due to the load or a cross-current cannot be known in most cases.

When a reactive current exceeding the rated current flows, the overcurrent protection could be activated, changing the internal voltage. This might cause a trouble in transmitting to the counterpart inverter the state of reactive current on the one inverter by changing the internal voltage, as in the case of the present invention.

To cope with this, signal transaction according to the present invention is initiated only after the overcurrent protection is inactivated by reducing the reactive current by changing the internal voltage in the one inverter.

If the reactive current is a cross-current-induced one, this causes the reactive currents of all the inverters to be reduced, and if it is a load-induced one, the reactive current of the counterpart inverter will increase by that amount, usually activating the protective device to stop the one inverter.

OPERATION OF FIG. 1 IN THE PRESENT INVENTION

To realize the operation corresponding to the aforementioned embodiment of the present invention, it is necessary for each inverter to detect a reactive current output (or input) by one inverter.

Detection of the reactive current is performed by the PWM control sections 17 and 27 shown in FIG. 1. That is, the PWM control sections 17 and 27 can detect the magnitude and direction of the reactive current and/or the reactive power because an output voltage $E_1$ and an output current $I_1$ and a phase difference $\phi_1$ generated by a phase detection section 16 or 26 are input into the PWM control sections 17 and 27. The PWM control sections 17 and 27 also cause the output voltage of the inverter to change minutely, and the output voltage E to change to (E+ΔE) or (E−ΔE), using the aforementioned control signal (PWM control signal).

The aforementioned period T, or the period $T_1$ or $T_2$, may be preset in the system, or it may be sufficient to set a period from a point at which the output voltage at a given timing crosses the zero point.

The term "magnitude" used in the above description with reference to the output voltage, output current, reactive current, or reactive power may be considered as expressed by a root-mean square or average value.

From the above description, it is made possible to balance reactive currents or reactive powers at all times when power is fed to a common load through the parallel operation of a plurality of inverters.

Figure 10:
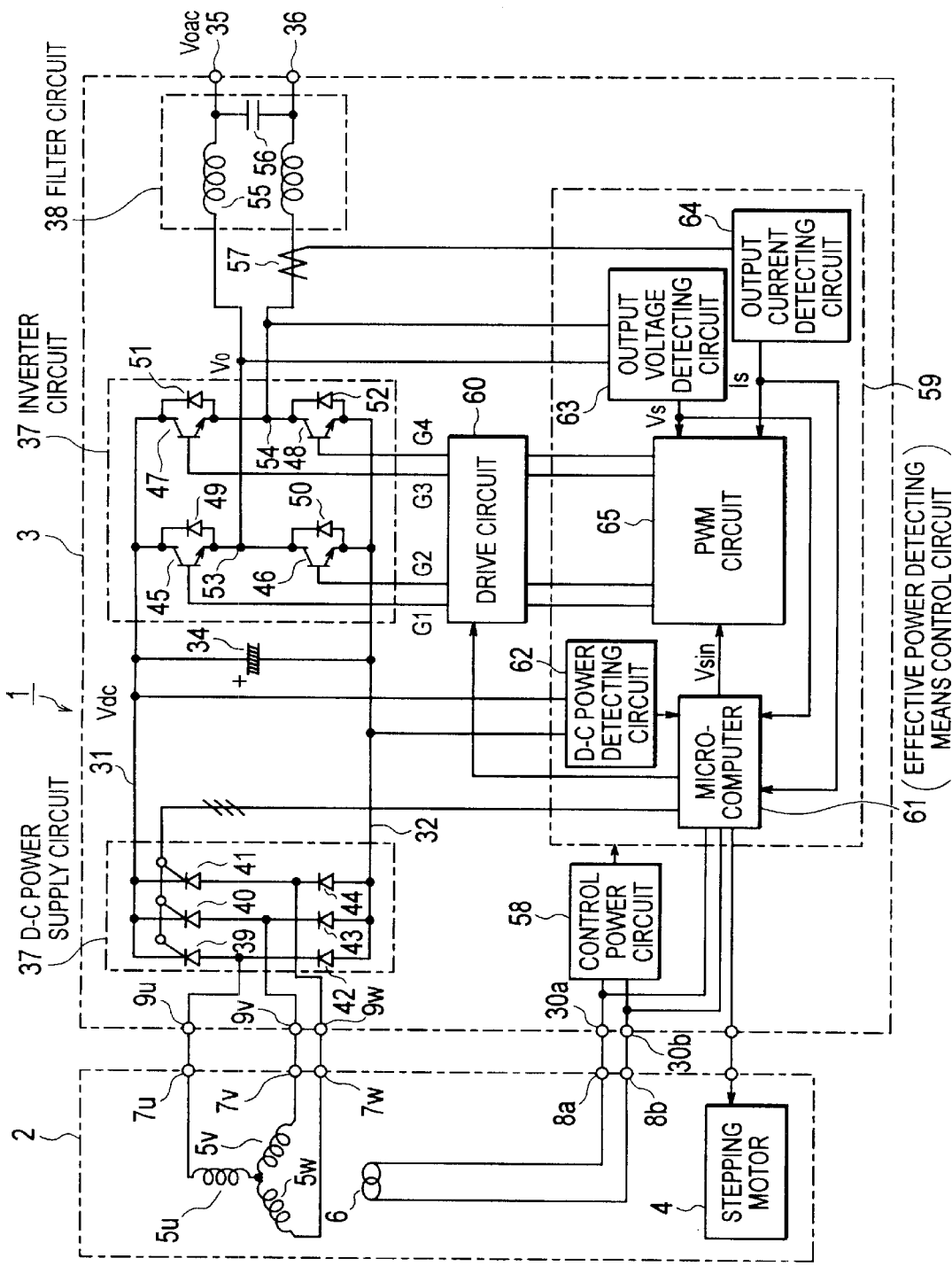
FIG. 10 is a circuit diagram of one inverter used in the present inverter.

FIG. 10 shows an embodiment of an inverter on one side used in the present invention.

In FIG. 10, a circuit diagram of a portable a-c power generating apparatus 1 that generates a 100-V, 50-Hz or 60-Hz a-c power, for example. This portable a-c power generating apparatus 1 comprises a three-phase a-c power generator 2 driven by an engine (not shown) and a single-phase inverter unit 3 connected to subsequent stages. The a-c power generator 2 has a stepping motor 4 for controlling engine revolution by controlling the amount of fuel (gasoline) fed to the engine, in addition to a rotor and an armature (both not shown). The armature has Y-connected main windings 5u, 5v and 5w, and an auxiliary winding 6. The main windings 5u, 5v and 5w, and the auxiliary winding 6 are each connected to input terminals 9u, 9v and 9w and input terminals 30a and 30b of the inverter unit 3.

The inverter unit 3, on the other hand, has the following construction. That is, a d-c power circuit 33 constituting a rectifying circuit is connected between the input terminals 9u, 9v and 9w and the d-c power lines 31 and 32. A smoothing capacitor 34 is connected between the d-c power lines 31 and 32, and in inverter circuit 37 and a filter circuit 38 are cascade-connected between the d-c power lines 31 and 32, and the output terminals 35 and 36.

The d-c power circuit 33 constituting the rectifying circuit has such a construction that thyristors 39~41 and diodes 42~44 are connected in the form of a so-called three-phase hybrid bridge, and the inverter circuit 37 has such a construction that transistors 45~48 (equal to switching elements) and reflux diodes 49~52 are connected in the form of a so-called full bridge.

The filter circuit 38 comprises a reactor 55 interposed between the output terminal 53 of the inverter circuit 37 and the output terminal 35 of the inverter unit 3, and a capacitor 56 connected across the output terminal 35 and 36 of the inverter unit 3.

The output terminal 54 of the inverter circuit 37 is connected directly to the output terminal 36 of the inverter unit 3, and a current transformer 57 for detecting output current is provided in a current path from the output terminal 36 to the filter circuit 38.

Furthermore, the inverter unit 3 comprises a control power supply circuit 58, a control circuit 59 and a drive circuit 60. The control power supply circuit 58 receives an a-c voltage induced in the auxiliary winding 6 via the input terminals 30a and 30b, and rectifies and smoothes the a-c voltage to generate a controlling d-c voltage (5 V,±15 V, for example) necessary for operating the control circuit 59. The a-c voltage induced in the auxiliary winding 6 is also input into the control circuit 59 to detect engine revolution.

The control circuit 59 comprises a microcomputer 61, a d-c power detecting circuit 62, an output voltage detecting circuit 63, an output current detecting circuit 64 and a PWM circuit 65. The microcomputer 61 has in the one-chip IC thereof a CPU, RAM, ROM, I/O port, A/D converter, timer circuit, oscillation circuit, and D/A converter, though not shown in the figure.

The d-c power detecting circuit 62 detects the d-c voltage $V_{dc}$ across the d-c power lines 31 and 32, and outputs the detected d-c voltage to the microcomputer 61 as a d-c voltage detected signal. In this case, the microcomputer 61 controls the thyristors 39~41 based on the d-c voltage detected signal so that the d-c voltage $V_{dc}$ becomes a predetermined voltage, 180 V, for example.

The output voltage detecting circuit 63 comprises a voltage dividing circuit for dividing the voltage across the output terminals 53 and 54 of the inverter circuit 37, and a filter (both the voltage dividing circuit and the filter are not shown) for removing carrier components from the divided rectangular-waveform voltage, and outputs the detected output voltage $V_S$ as an output voltage detecting signal to the microcomputer 61 and the PWM circuit 65.

The output current detecting circuit 64 (corresponding to the output current detecting means) converts the output current detected by the current transformer 57 into a predetermined voltage level, and outputs the detected output current Is as an output current detecting signal to the microcomputer 61 and the PWM circuit 65.

The PWM circuit 65 performs PWM control to generate drive signals G1~G4 for the transistors 45~48. The drive signals G1~G4 are given to the bases of the transistors 45~48, respectively, via the drive circuit 60.

In the microcomputer 61, the output frequency can be set to either of 50 Hz or 60 Hz through switching inputs from the switching input section (not shown). When a 50-Hz, 100-V a-c current, for example, is to be generated, a sine-wave standard signal $V_{sin}$ of the same frequency as that of the set output frequency is given to the PWM circuit 65. This sine-wave standard signal $V_{sin}$ can be adjusted so that the detected output voltage $V_S$ of the output voltage detecting circuit 63 become equal to a 100-V output, that is, so that output voltage feedback control can be accomplished. As will be described later, this sine-wave standard signal $V_{sin}$ is designed to adjust output frequency on the basis of output effective power.

The PWM circuit 65 generates drive signals G1~G4 so that a high-frequency voltage $V_O$(100 V, 50 Hz or 60 Hz in effective terms) of a rectangular waveform as shown in FIG. 11(b) can be obtained from this sine-wave standard signal $V_{sin}$ and a carrier wave $S_c$ constituting a triangular wave of 16 kHz, for example (it is shown as a waveform having an extremely low frequency in the figure for the sake of convenience) as shown in FIG. 11(a). Generation of the frequency is accomplished by shifting the frequency of the sine-wave standard signal $V_{sin}$ that can be shifted within the range of ±Δ around 50 Hz, for example. An a-c output $V_{oac}$ of 100 V, 50 Hz or 60 Hz, for example, is formed after high-frequency components of the high-frequency voltage $V_O$ generated in this way have been removed by the filter circuit 38, as shown in FIG. 11(c).

The microcomputer 61 functions as both an effective power detecting means and a control means. In the following, these functions and operation of the microcomputer 61 will be described.

Figure 13:
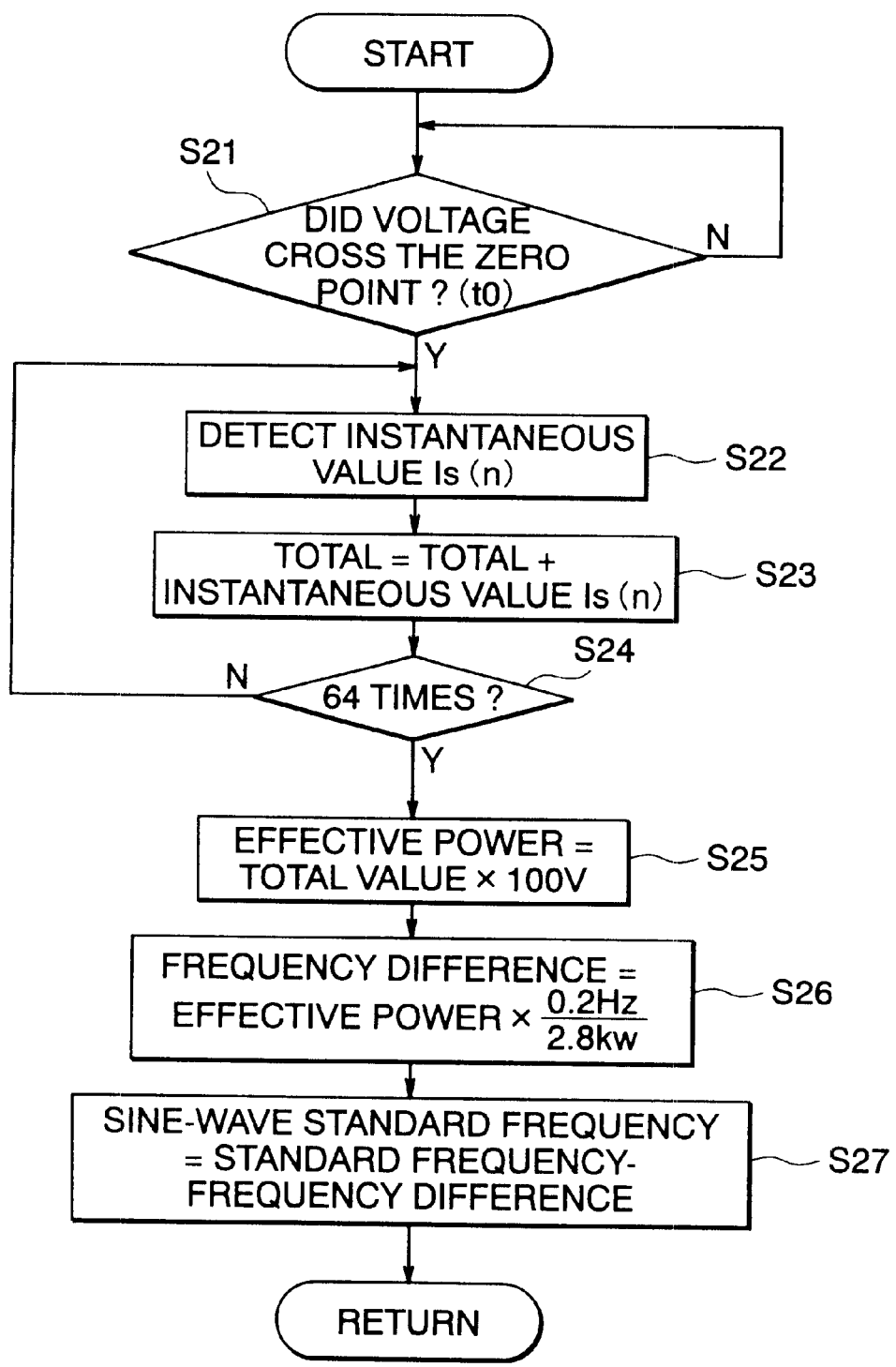
FIG. 13 is a flow chart of assistance in explaining the contents of control.

As operation is started, the microcomputer 61controls the output frequency in accordance with the control flow chart shown in FIG. 13. That is, the first zero-cross point (refer to FIG>12. Timing t0) of one cycle of the output voltage $V_0$ is detected in Step S21. In this case, the microcomputer 61 judges the timing t0 of the first zero-cross point (at the timing at which the signal changes to the positive side) of one cycle of the sine-wave standard signal $V_{sin}$ because the effective zero-cross points of the sine-wave standard signal $V_{sin}$ and the output voltage $V_0$ theoretically agree with each other. After that, instantaneous vale $I_S(n)$ (n=1~64) is detected from the detected output current $I_S$. at 64 timings (at equal time intervals) for the ½ cycles, and sequentially added up (Steps S22, S23 and S24). Upon completion of 64 summations ("YES" in Step S22), the operation proceeds to Step S25 where the effective power is calculated (detected).

In this case, the output voltage is uniquely treated as 100 V, and the product of the total value and the output voltage 100 V is obtained. At this time, when the load W is a resistance load, the voltage-current phase does not change, and when the load W is a coil load and a capacitor load, the voltage-current phase changes and the output current instantaneous value $I_S.(n)$ sometimes contains a negative component, resulting in a reactive power. The total value in Step S25 can be regarded as an average current (without dividing the total value by 64) so long as the number of detection timings of 64 is not taken into account.

Next, the frequency difference for frequency correction is set in Step S26. In this case, the frequency difference can be obtained using an equation where the effective power is multiplied by a constant (0.2 Hz/2.8 kW). In Step S27, the sine-wave standard frequency $V_{sin}$ to be changed is obtained by subtracting the frequency difference from the standard frequency. The value of constant (0.2 Hz/2.8 kW) will be described later.

In this case, the width of frequency fluctuation is set to 50.10 Hz as the upper limit and 49.90 Hz as the lower limit, and the upper frequency limit is set to 50.10 Hz as the standard frequency. A sine-wave standard frequency $V_{sin}$ to be changed can be obtained by subtracting the frequency difference from this standard frequency. The relationship between the aforementioned effective power and the sine-wave standard frequency $V_{sin}$. to be changed is as shown in FIG. 15(a).

Though not shown in the flow chart, the microcomputer 61 supplies this sine-wave standard frequency $V_{sin}$ to the PWM circuit 65 so as to set the output frequency to the aforementioned sine-wave standard frequency $V_{sin}$ in the next half cycle. In this way, the output frequency is adjusted in accordance with the effective power.

Figure 14A:
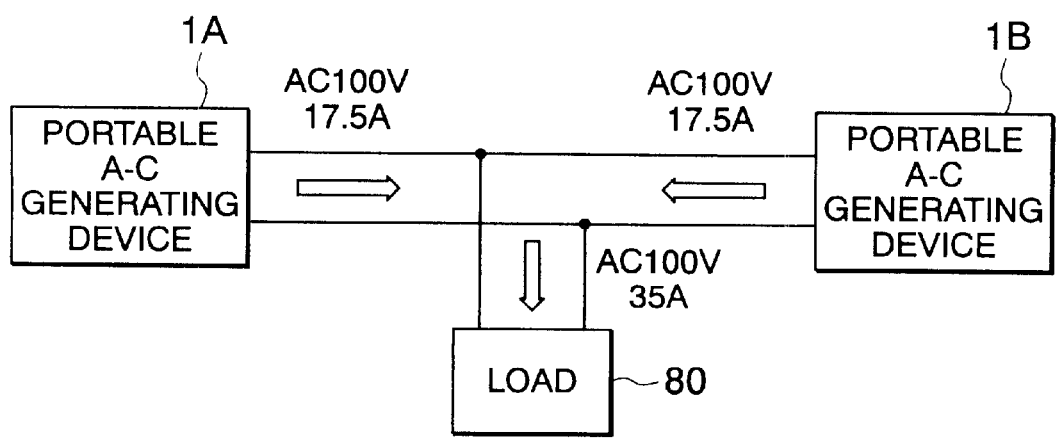
FIGS. 14(*a*) is a diagram showing an example of the operation of two portable a-c generating apparatuses, (b) is a diagram showing an example of the operation of two portable a-c generating apparatuses in the state where a cross-current is generated.

In the following, the portable a-c power generating apparatuses 1 having the aforementioned construction connected in parallel to feed power to the load 80 will be described. In FIG. 14(a), assume that any one of two portable a-c power generating apparatuses, for example, denote a portable a-c power generating apparatus 1A and the other a portable a-c power generating apparatus 1B. Now, assume that the load 80 consumes a power of 35 A at a-c 100 V, and both the portable a-c power generating apparatuses 1A and 1B are operating in a good balance. In such a state, they generate a power of 50 Hz, 100 V and 17.5 A. In this state, no cross-current does flow between the portable a-c power generating apparatuses 1A and 1B.

Figure 14B:
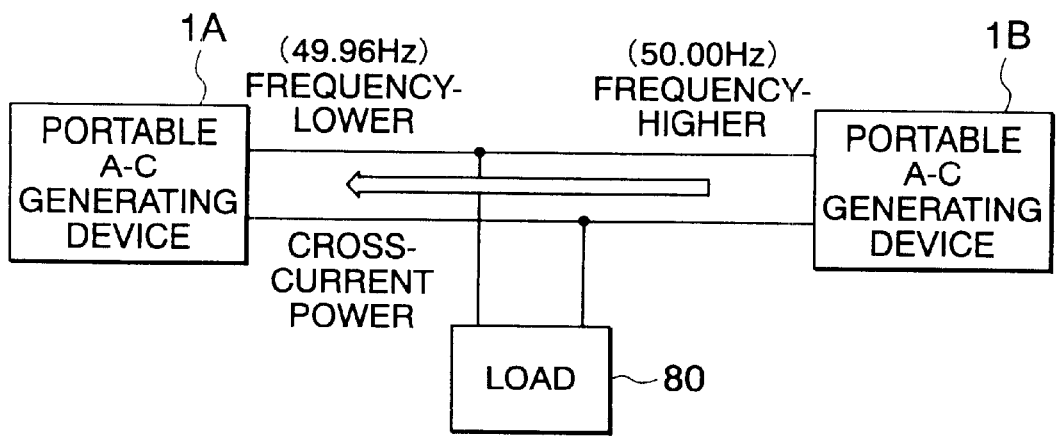

In this state, if the output frequency of the portable a-c power generating apparatus 1A instantaneously happens to change to 49.96 Hz, for example, for some reason or other (due to a change in load, for example), as shown in FIG. 14(b), then a cross-current flows from the portable a-c power generating apparatus 1B to the portable a-c power generating apparatus 1A. As a result, the effective power in the portable a-c power generating apparatus 1B from which the cross-current flows increases, whereas the effective power of the portable a-c power generating apparatus 1A to which the cross-current flows decreases.

In the portable a-c power generating apparatus 1A, this causes the effective power in Step S25 in the flow chart of FIG. 13 to decrease, and the frequency difference in Step S26 to decrease. Thus, the sine-wave standard frequency $V_{sin}$ in Step S27 increases. In other words, the output frequency is increased (refer to FIG. 15(b)).

In the portable a-c power generating apparatus 1B, the frequency difference in Step S26 increases because the effective power in Step S25 in the flow chart of FIG. 13 increases. This causes the sine-wave standard frequency $V_{sin}$. in Step S27 to decrease. That is, the output frequency is reduced.

Figure 15C:
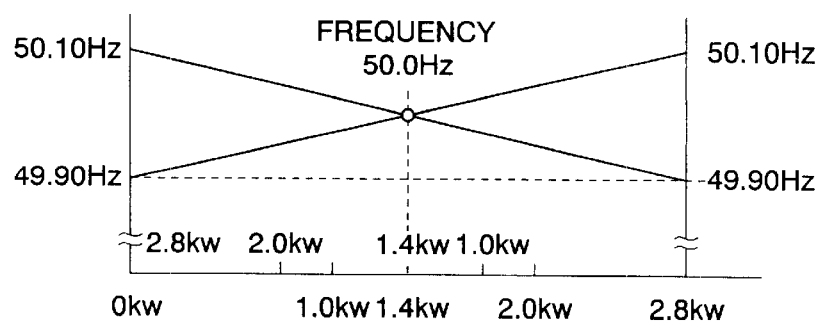

The aforementioned control is performed separately for the portable a-c power generating apparatuses 1A and 1B in such a manner that the output frequency in any one portable a-c power generating apparatus is controlled to increase, while the output frequency in the other portable a-c power generating apparatus is controlled to decrease, and that the output frequencies of the portable a-c power generating apparatuses 1A and 1B eventually agree with each other (refer to FIG. 15(c). Thus, cross-current is inhibited.

Since control is effected in such a manner that the higher the effective power the more the frequency is lowered, conversely speaking, that the lower the effective power the more the frequency is raised, even when the output frequencies of the two portable a-c power generating apparatuses 1A and 1B which are under parallel operation do not agree with each other, they can be immediately brought into agreement, positively inhibiting cross-current. In other words, load distribution between the two portable a-c power generating apparatuses 1A and 1B can be set on a one-to-one basis.

The constant (0.2 Hz/2.8 kW) is selected with reference to Step S26 in FIG. 13. This is because the ratio of frequency drop corresponding to an increase in effective power is selected so that the frequency is lowered by 0.0714 Hz with a 1-kW increase in effective power, as shown in FIG. 15(a).

As shown in FIG. 15(b), each of the portable a-c power generating apparatuses 1A and 1B in the example shown in FIG. 15 is controlled so that the frequency is lowered by approximately 0.0714 Hz for a 1-kW increase in effective power. Consequently, when the portable a-c power generating apparatuses 1A and 1B are operated in parallel to feed power to the common load 80, as shown in FIG. 14, each of the portable a-c power generating apparatuses 1A and 1B is operated at 50.00 Hz, and brought into a steady-state operation so that output is always kept at 1.4 kW. If the operating state is changed so that the portable a-c power generating apparatus 1A outputs 2.0 kW and the portable a-c power generating apparatus 1B outputs 0.8 kW, the portable a-c power generating apparatus 1A is controlled in such a manner that the output frequency of 49.957 Hz is raised by 0.043 Hz (so that the apparatus 1A can be operated at 50.00 Hz), while the portable a-c power generating apparatus 1B is controlled in such a manner that the output frequency of 50.043 Hz is lowered by 0.043 Hz (so that the apparatus 1B can be operated at 50.00 Hz).

In the state described with reference to FIG. 15, both the two portable a-c power generating apparatuses 1A and 1B are put into a steady-state operation under a one-to-one load distribution since the aforementioned constant for each of the portable a-c power generating apparatuses 1A and 1B is set to 0.0714 (=0.2/2.8).

The present invention, however, is not limited to the operating state where the load distribution described with reference to FIG. 15 is kept one-to-one.

Figure 16:
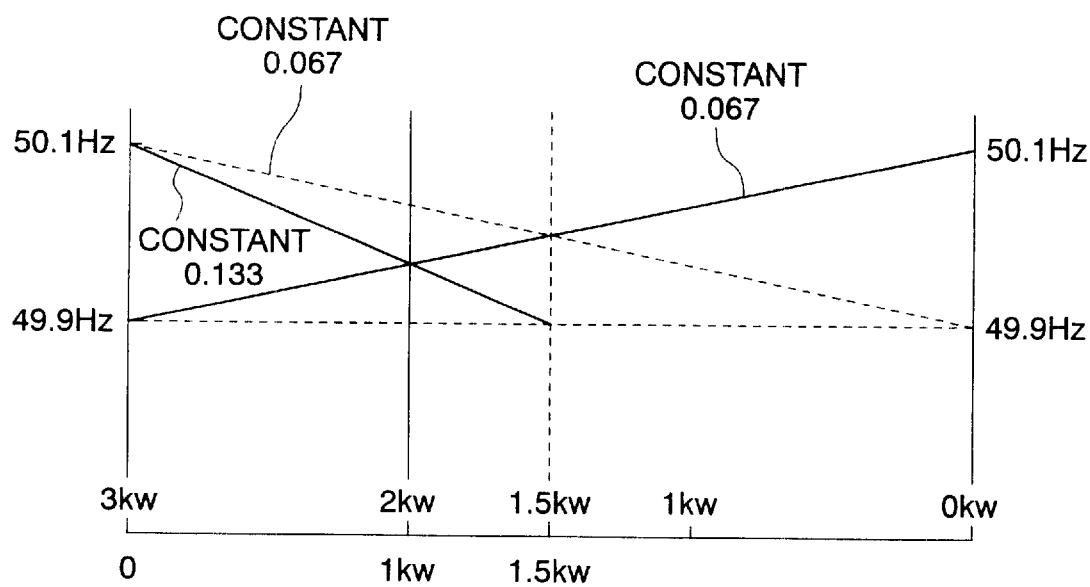
FIG. 16 is a diagram of assistance in explaining a one-to-two load sharing under a 3-kW load.

FIG. 16 is a diagram of assistance in explaining the state where the ratio of load distribution is one to two under a load of 3 kW FIG. 16 shows the state where the constant is set to 0.2/1.5 (=0.133) on the side of the portable a-c power generating apparatus 1A, while the constant is set to 0.2/3.0 (=0.067) on the side of the portable a-c power generating apparatus 1B. That is, control is effected in such a manner that when the portable a-c power generating apparatus 1A outputs 1 kW, the frequency becomes 50.00 Hz, and when the portable a-c power generating apparatus 1B output 2 kW, the frequency becomes 50.00 Hz. In this state, a steady-state operation is maintained with a load distribution of one to two for the load 80.

Assuming that the constant is set to 0.2/3.0 (=0.067) on the side of the portable a-c power generating apparatus 1A, the graph assumes a dotted line as shown in FIG. 16, where each of the portable a-c power generating apparatuses 1A and 1B outputs 1.5 kW, maintaining a one-to-one load distribution.

To select the aforementioned constants, a plurality of constant tables for determining the correspondence of effective power to output frequency should be prepared and one constant table be selected from among them so that the control of output frequency can be performed in accordance with the selected constant table.

Figure 17:
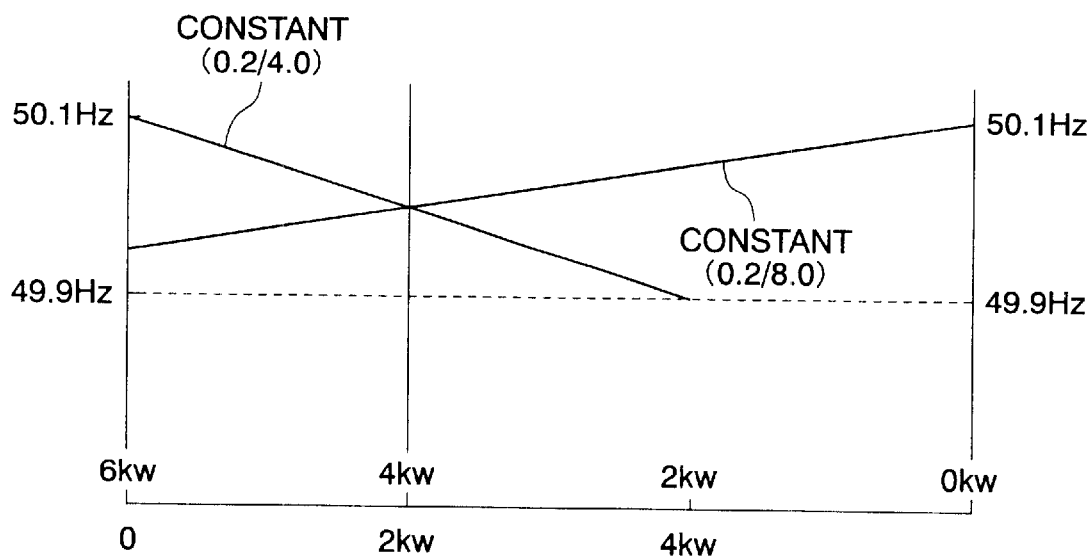
FIG. 17 is a diagram of assistance in explaining a one-to-two load sharing under a 6-kW load.

FIG. 17 is a diagram of assistance in explaining the case where the ratio of load distribution becomes one to two under the load of 6 kW. In the case with reference to FIG. 17, the constant on the side of the portable a-c power generating apparatus 1A is set to 0.05, and the corresponding figure for the portable a-c power generating apparatus 1B to 0.025.

In the embodiment shown in FIG. 13, where the effective power is detected during a half-cycle period of a-c voltage, the detection can be accomplished in a short period, and the subsequent frequency control can be performed quickly.

According to the embodiment shown in FIG. 13, where the output current is detected in terms of average value, the output current can be calculated, or detected, easily.

Figure 18:
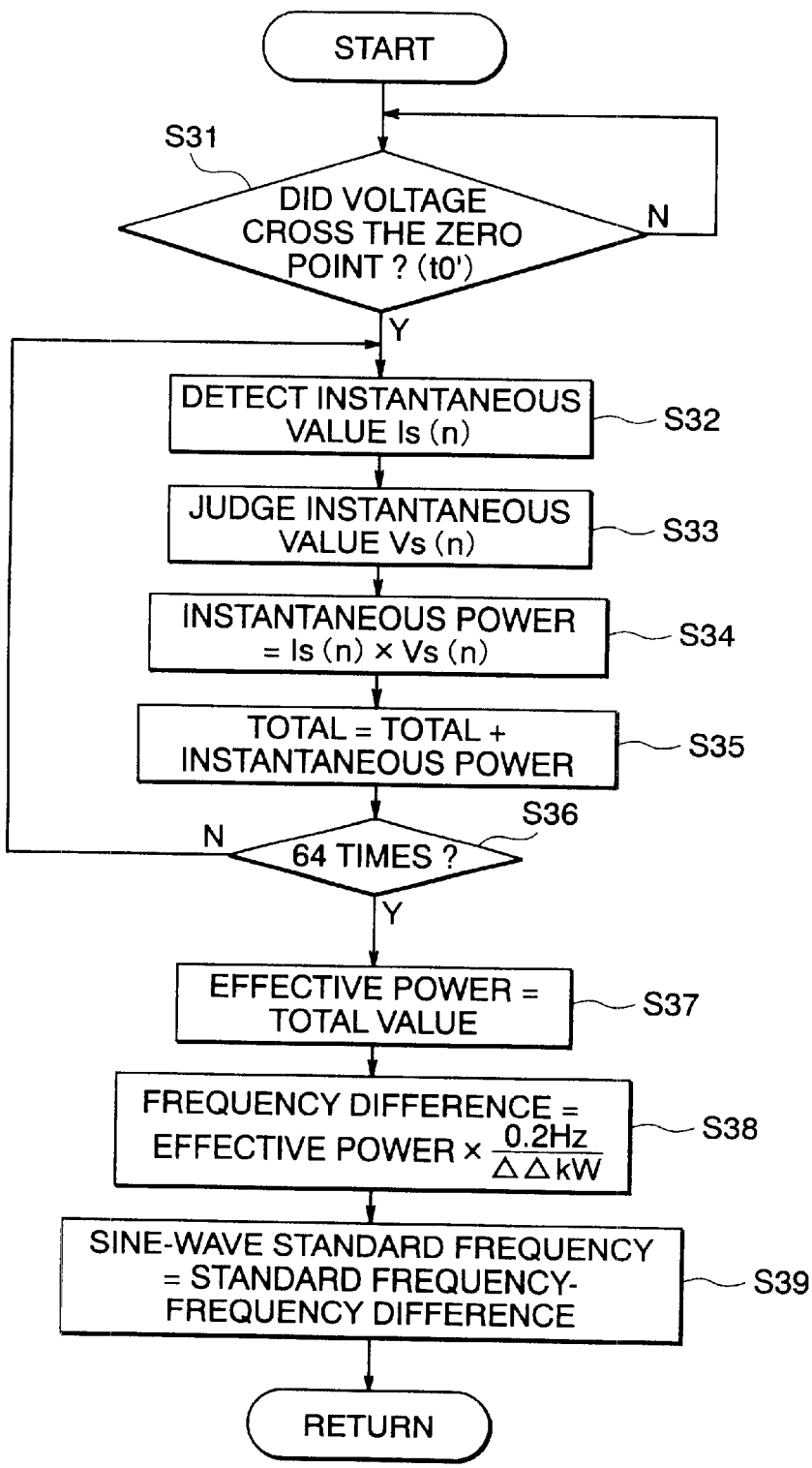
FIG. 18 is a flow chart of assistance in explaining the contents of control in another embodiment of the present invention.
Figure 19:
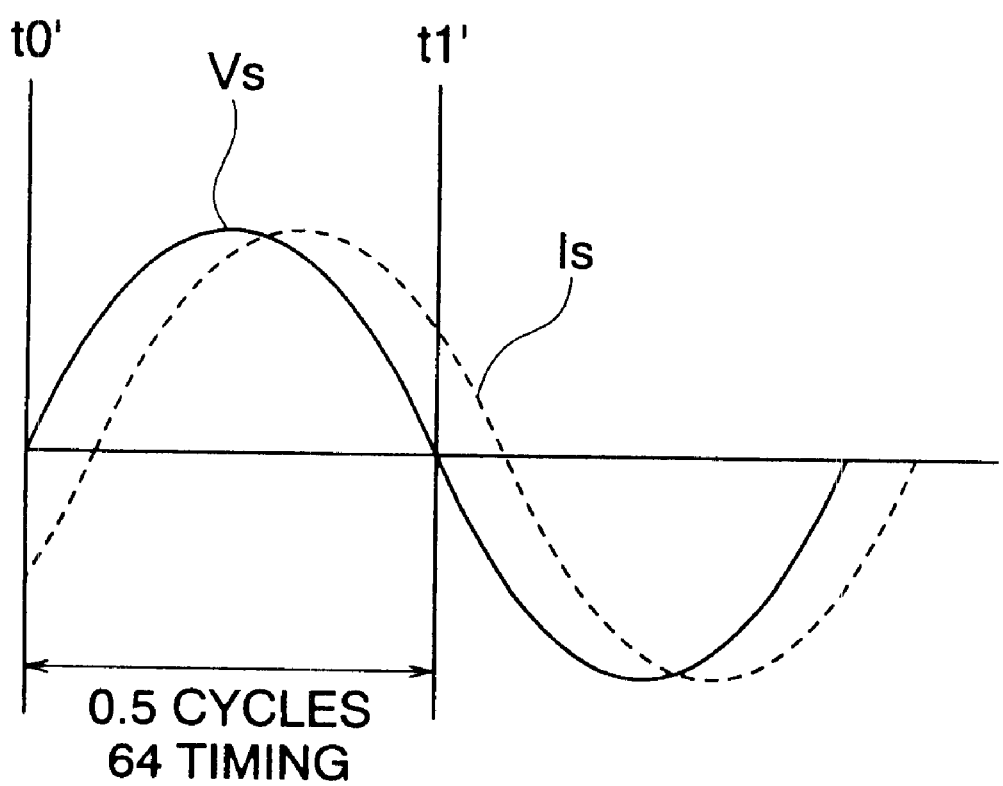
FIG. 19 is a diagram corresponding to FIG. 12.

In the embodiment shown in FIG. 13, the output voltage is uniquely set to 100 V without trying to detect it, and the effective power is detected by obtaining the product of this output voltage of 100 V and the average value of detected current (the total value as mentioned in Step S25 in the flow chart). In the embodiment shown in FIG. 18, however, the detected voltage $V_S$ in the output voltage detecting circuit 63 may be used to detect the effective power (the instantaneous value $V_S(n)$ of the detected voltage $V_S$ is detected in Step S33 in the flow chart). In this case, the output voltage detecting circuit 63 corresponds to the output voltage detecting means. Because a filter (not shown) is provided in the output voltage detecting circuit 63, the high-frequency carrier wave components of the output voltage $V_O$ can be eliminated, and as a result, the a-c output voltage $V_{oac}$ can be positively detected. Furthermore, the effects of the reactor voltage drop in the filter circuit 38 are eliminated from the detected voltage $V_S$. The zero-cross point described in Step S31 is actually the zero-cross point (at timing t0') of the detected voltage $V_S$, as shown in FIG. 19. In Steps S32~S37, instantaneous effective power values are calculated based on the instantaneous value $V_S(n)$ and the instantaneous value $I_S(n)$ of the output current detecting signal $I_S$, and added up to detect the effective power.

Figure 20:
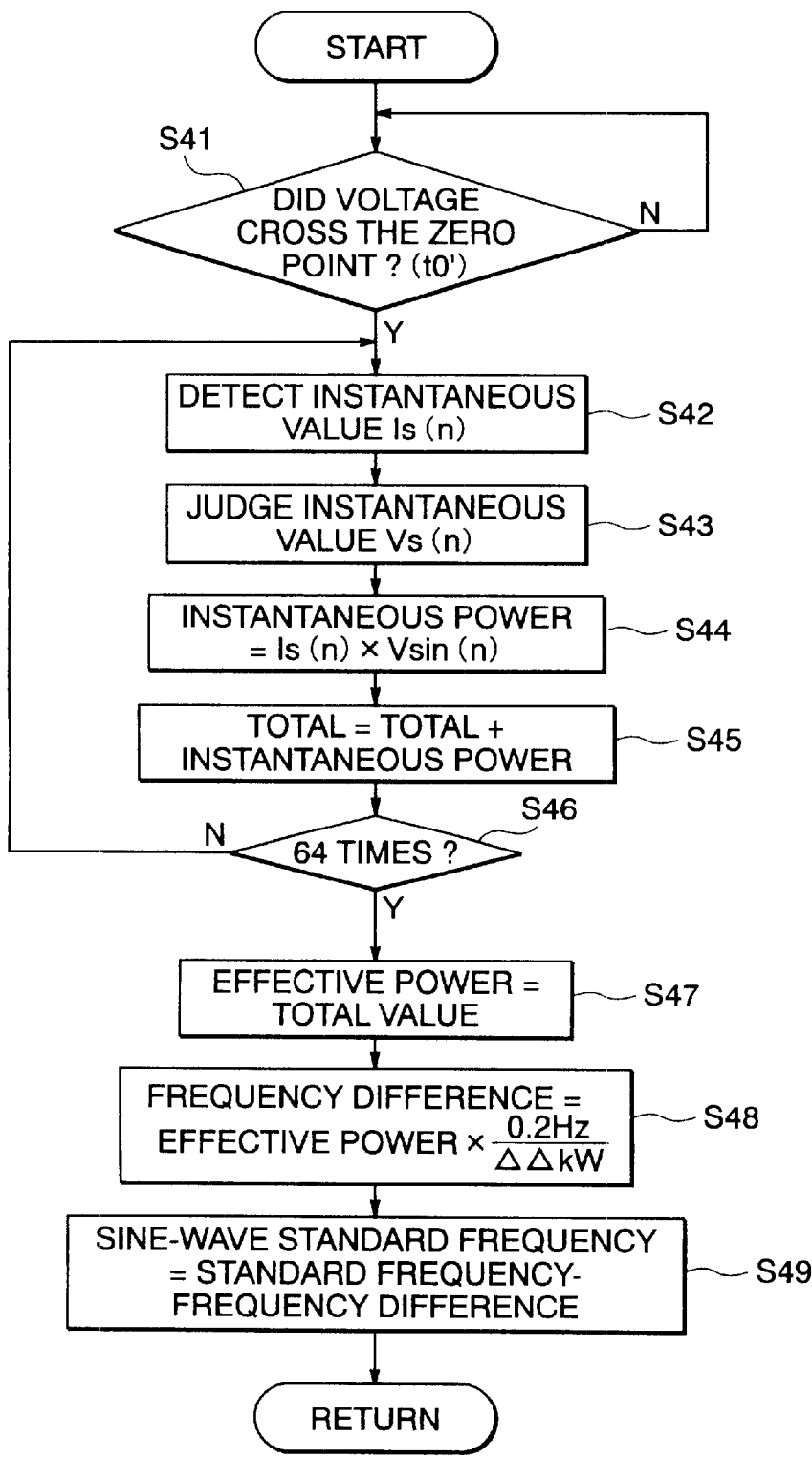
FIG. 20 is a flow chart of assistance in explaining the contents of control in a yet another embodiment of the present invention.

FIG. 20 shows still another embodiment of the present invention, where the effective power is detected (calculated) on the basis of the sine-wave standard signal $V_{sin}$ and the output voltage detecting signal $I_S$ (refer to FIG. 12). That is, in Step S43, the instantaneous value $V_{sin}(n)$ of the sine-wave standard signal $V_{sin}$ is discriminated, and instantaneous effective power values calculated based on the instantaneous value $V_{sin}(n)$ and the output current detecting signal $I_S$, and added up to detect the effective power.

This embodiment has the following advantages. That is, the sine-wave standard signal $V_{sin}$ can be regarded as the output voltage $V_O$ since the sine-wave standard signal $V_{sin}$ is equivalent to the output voltage $V_O$ though they are different in voltage level. Thus, there is no need of providing an output voltage detecting means on the output side of the inverter circuit. This therefore leads to a simplified construction.

Figure 21:
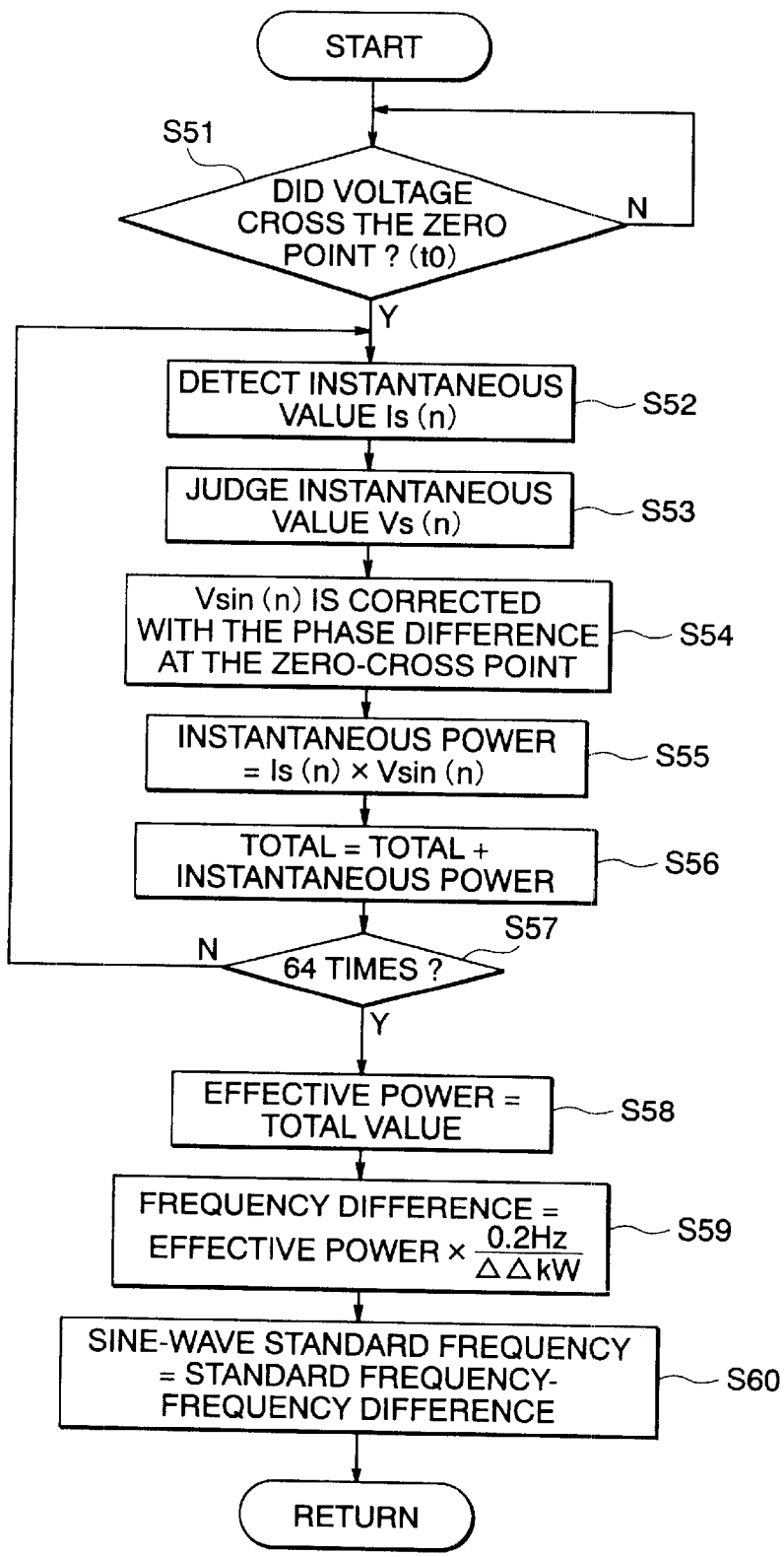
FIG. 21 is a flow chart of assistance in explaining the contents of control in a further embodiment of the present invention.
Figure 22:
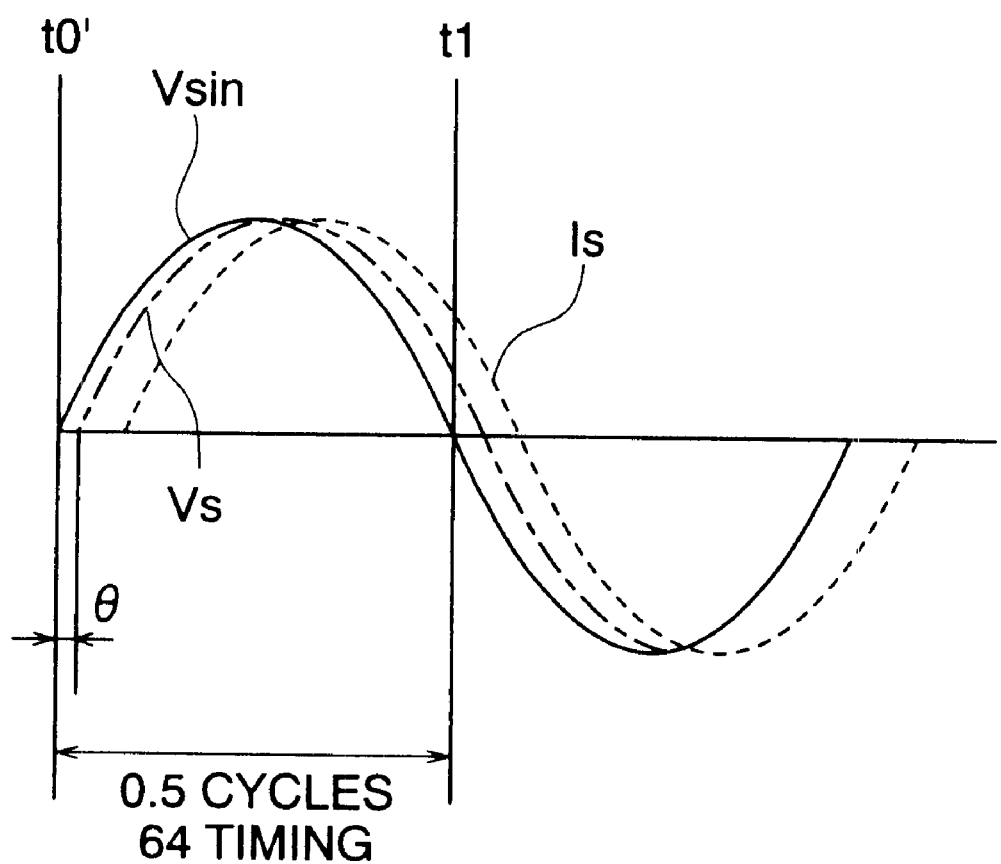
FIG. 22 is a diagram corresponding to FIG. 12.

FIG. 21 shows a further embodiment of the present invention. This embodiment is different from the embodiment shown in FIG. 20 in the following points. That is, the output voltage detecting signal $V_S$ lags in terms of time behind the aforementioned sine-wave standard signal $V_{sin}$, as shown in FIG. 22. Taking this into account, the zero-cross points of the output voltage detecting signal $V_S$ with respect to the sine-wave standard signal $V_{sin}$ are detected to know the phase difference θ of each zero-cross point. The effective power is detected by correcting the instantaneous value $V_{sin}(n)$ of the sine-wave standard signal $V_{sin}$ based on the phase difference θ.

The zero-cross point (timing t0) in Step S51 is the zero-cross point of the sine-wave standard signal $V_{sin}$, and the instantaneous value $V_{sin}(n)$ in Step S53 is an instantaneous value ahead of the actual output voltage $V_O$ by the phase difference θ. In Step S54, therefore, the instantaneous value $V_{sin}(n)$ is corrected so that it becomes an instantaneous value which is ahead by the phase difference θ. This permits a correct effective power to be detected.

Figure 23:
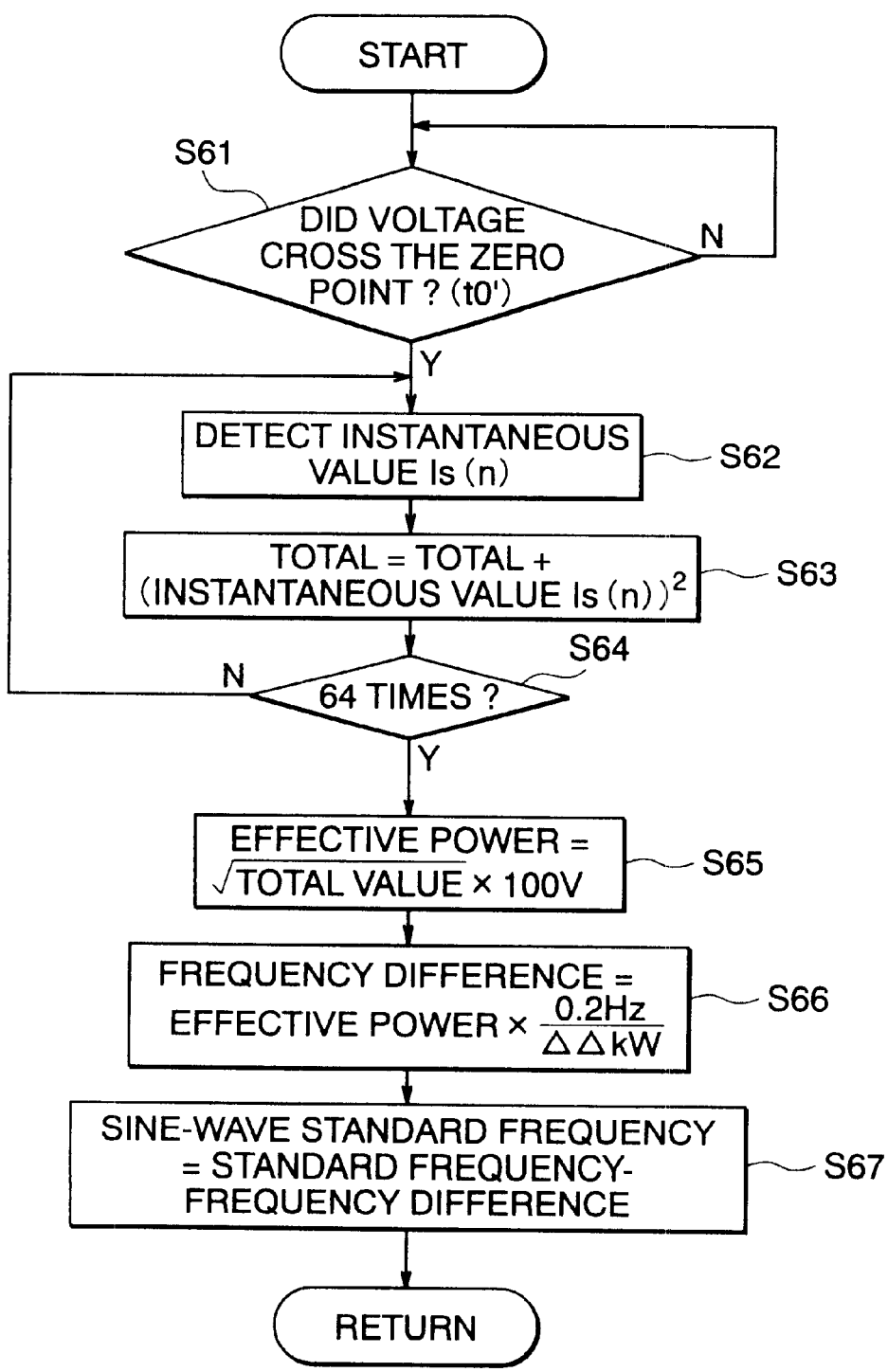
FIG. 23 is a flow chart of assistance in explaining the contents of control in still a further embodiment of the present invention.

FIG. 23 shows still a further embodiment of the present invention, which is characterized in that the output current can be detected in a root-mean square value. That is, the output current is detected in terms of the root-mean square value by squaring and summing the instantaneous values $I_S(n)$, and the total is raised to the negative one-half power, as shown in Step S65.

Figure 24:
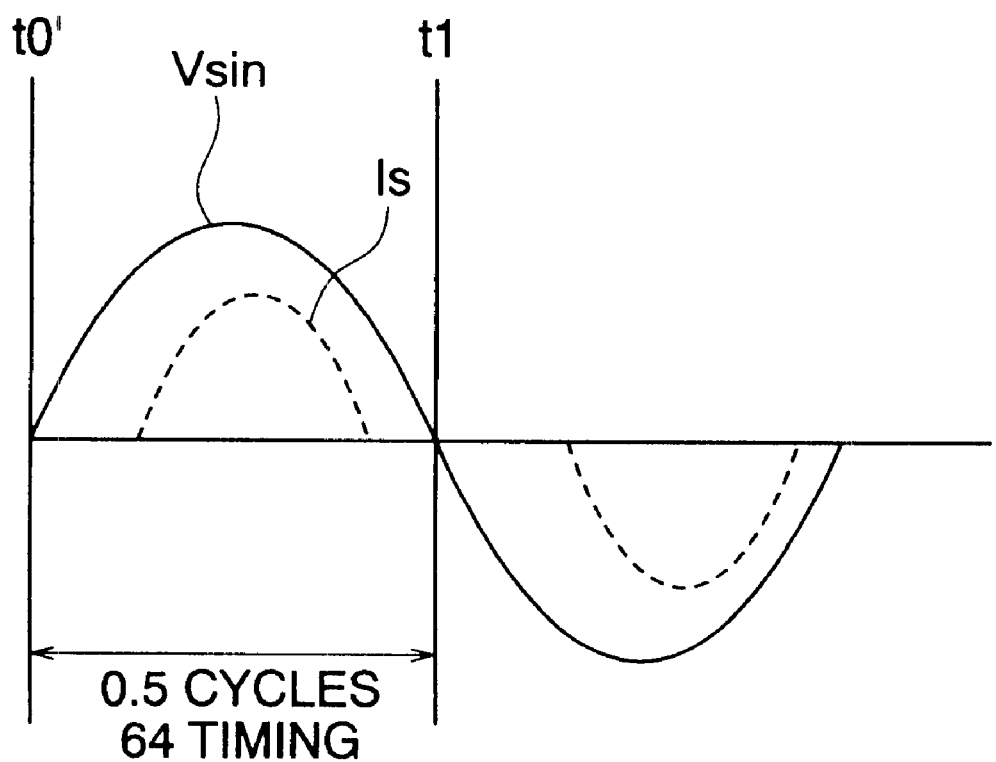
FIG. 24 is a diagram corresponding to FIG. 12.

According to this embodiment, the output current can be detected satisfactorily even when the load of the portable a-c power generating apparatus 1 has a full-wave rectifying means. It should be noted in this connection that when the load has a full-wave rectifying means, an output current as shown in FIG. 24 flows. In this case, the root-mean square value is better suited for the purpose because the output current among the effective power output by the portable a-c power generating apparatus 1 is not a sine-wave alternating current. In fact, the output current can be detected satisfactorily with the root-mean square value even when the load has a full-wave rectifying means. The root-mean square value may be applied to any type of load, including resistance, coil, or capacitor load. When detecting the output current in terms of average value, the load should preferably be a resistance, coil, or capacitor load.

From the above description, it is made possible to detect the effective power output by each inverter (indicated as a portable a-c power generating apparatus in the above embodiments), operate each inverter with the output frequency obtained by referring to a correlation table selected from among (generally a plurality of) correlation tables showing the correlations between the output effective power and the output frequency, and set a load distribution between the inverters. Needless to say, even the prior art can determine the appropriate distribution ratio of the output effective power shared by the inverters under parallel operation.

The microcomputer 61 shown in FIG. 10 also works as an effective power detecting means. When an unwanted cross-current power is generated and flows into the inverter circuit shown in FIG. 10, the microcomputer 61 detects the inflow power. That is, the effective power detecting means (in the microcomputer 61) detects a negative voltage.

The microcomputer 61 has a function of integrating the power (assumed to be a negative value $-P_A$) detected by the effective power detecting means to calculate $J = \int (-P_A)dt$, serving as an electric power calculating means mentioned in the present invention.

Control is effected in the following manner in the first embodiment of the present invention. That is, when the electric power calculating means calculates a negative power value, the terminal voltage of the smoothing capacitor 34 continues rising, as described above. So, the internal voltage (E—that can be conceptually regarded as a voltage $V_{oac}$) in the inverter circuit 37 is caused to increase by controlling the bases of the transistors 45 through 48 in the inverter circuit 37 via the PWM circuit 65 by increasing the amplitude value of the sine-wave standard signal $V_{sin}$. That is, the internal voltage E is controlled in accordance with the magnitude of the aforementioned inflow power J.

Control is effected in the following manner in the second embodiment of the present invention. That is, the internal voltage E is increased by a predetermined amount only when the value of the aforementioned inflow power J has increased up to a predetermined threshold value $J_{THO}$.

Control is effected in the following manner in the third embodiment of the present invention. That is, the internal voltage E of the inverter circuit 37 is increased by calculating the inflow power, as shown in the first or second embodiment. To prevent the possible inclusion of unwanted errors in the value of the inflow power J calculated by the microcomputer 61, the errors are corrected using the d-c power detecting circuit 62 shown in the figure for detecting the terminal voltage of the smoothing capacitor 34. Furthermore, the value J calculated as the inflow power is reset to a predetermined value by grasping that the voltage detected by the d-c power detecting circuit 62 has become the threshold value $V_{THO}$ that is provided in advance as a value smaller than the unwantedly increased value.

Assuming that the threshold value $V_{THO}$ is set to a value equal to the abovementioned $V_O$, that the terminal voltage of the smoothing capacitor 34 is $V_O$ means the absence of the inflow power J. If the calculated inflow power J at that time has a "predetermined value," it can be regarded as the amount of error. Consequently, the amount of error is reset to zero.

In the fourth embodiment of the present invention, control is accomplished in the following manner. That is, the threshold value $V_{THO}$ need not be limited to one, but a plurality of threshold values $V_{THO}$, $V_{TH1}$, $V_{TH2}$,—that are equal to or larger than $V_O$ are provided, and a plurality of initial values for resetting the inflow power corresponding to each threshold value are also provided. When the terminal voltage of the smoothing capacitor 34 reaches a certain threshold value $V_{TH1}$, the calculated inflow power is reset to the initial value $J_{TH1}$, and when the terminal voltage of the smoothing capacitor 34 reaches another threshold value $V_{TH2}$, the calculated inflow power is reset to the initial value $J_{TH2}$,— and so on.

From the above description, it may have become apparent that eyeing the fact that the power P output by each inverter is generally detected in the parallel operation of inverters, a means for integrating the power P is provided to calculate "inflow power J" to inhibit the generation of cross-current power by increasing the internal voltage E of the inverter. In this way, the generation of cross-current power can be inhibited based only on the inflow power by providing a power calculating means.

Figure 25:
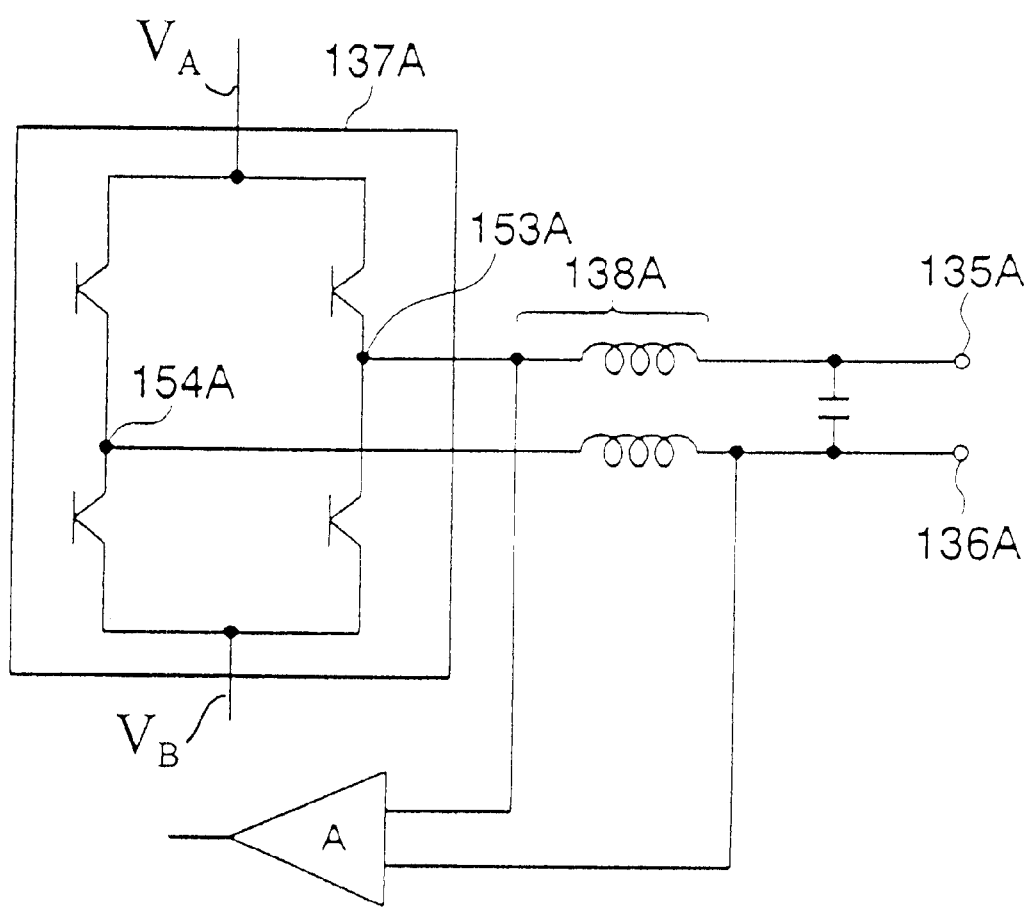
FIG. 25 is a diagram of assistance in explaining the position at which a potential is taken out in the present invention.
Figure 26:
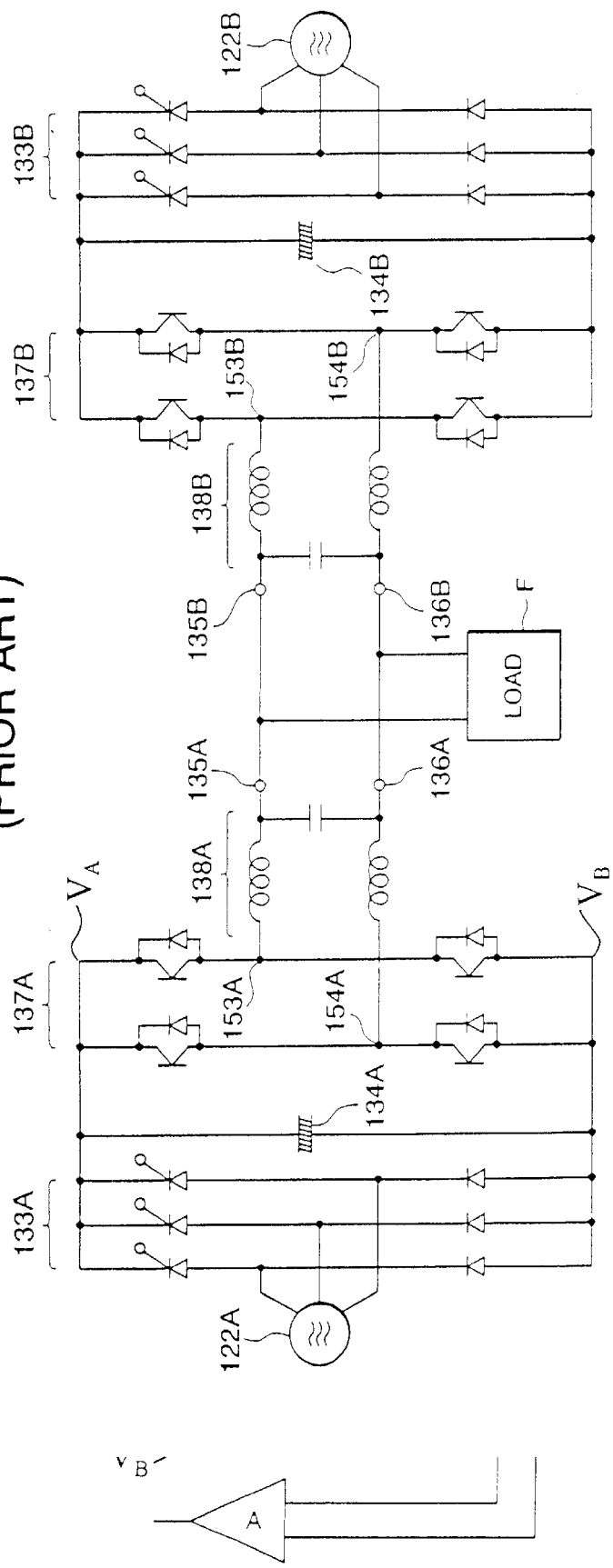
FIG. 26 is a circuit diagram showing the state where two inverters are under parallel operation.
Figure 27:
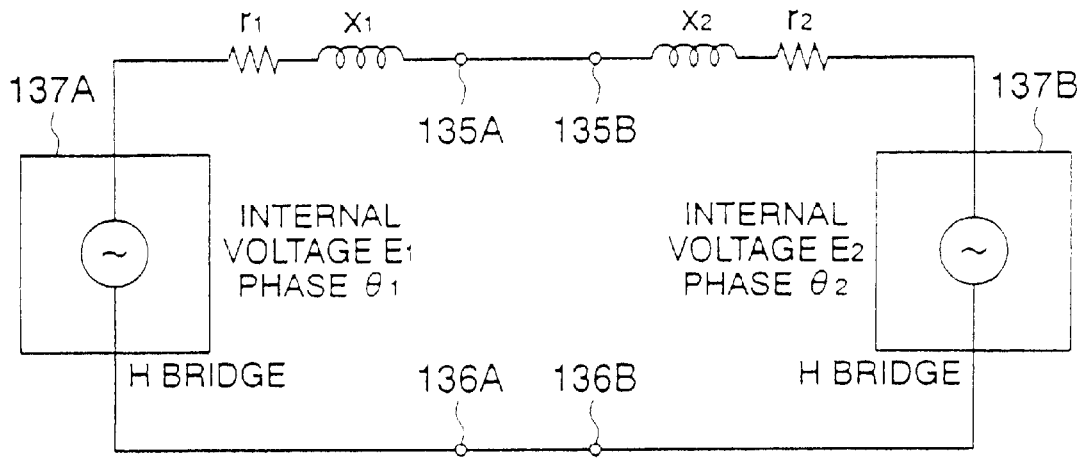
FIG. 27 is an equivalent circuit diagram taking into account only a cross-current in the circuit configuration shown in FIG. 26.
Figure 28:
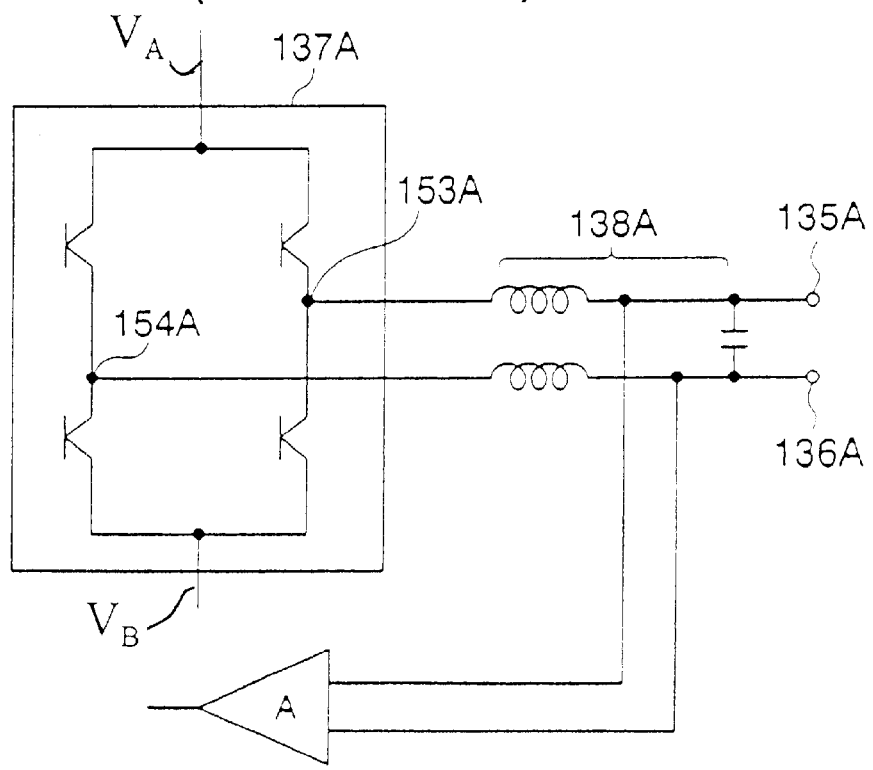
FIG. 28 is a diagram of assistance in explaining the position at which a potential is taken out, as heretofore commonly practiced.
Figure 29:
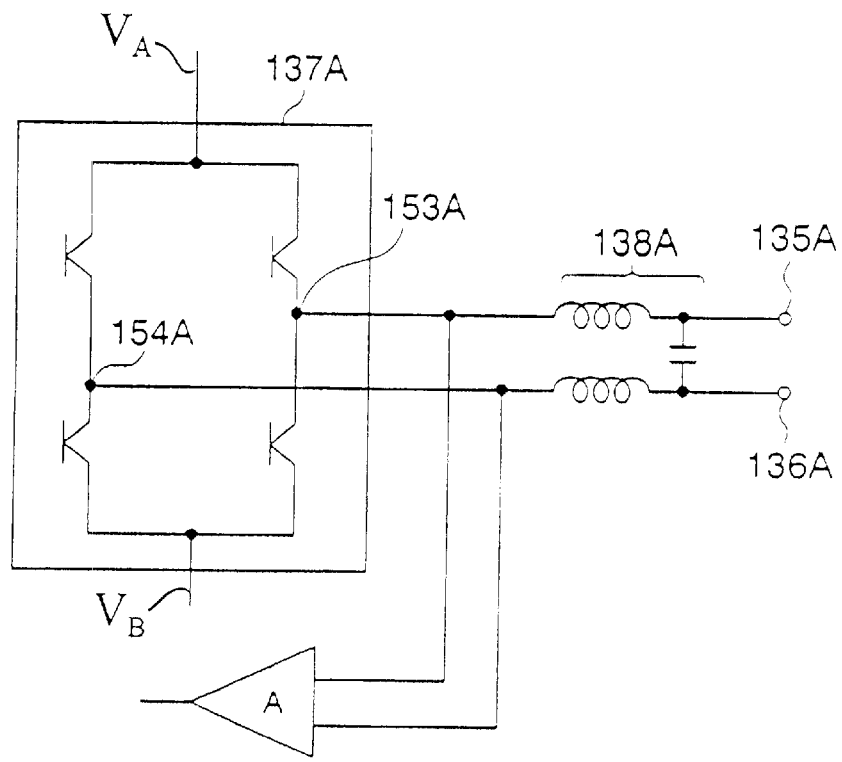
FIG. 29 is a diagram of assistance in explaining the position at which a potential is taken out, as disclosed in the Specification of Japanese Patent No. 2688660.

FIG. 25 is a diagram of assistance in explaining the position at which the potential is extracted according to the present invention. Numerals used in the figure correspond to those used in FIGS. 28 and 29.

Figure 30:
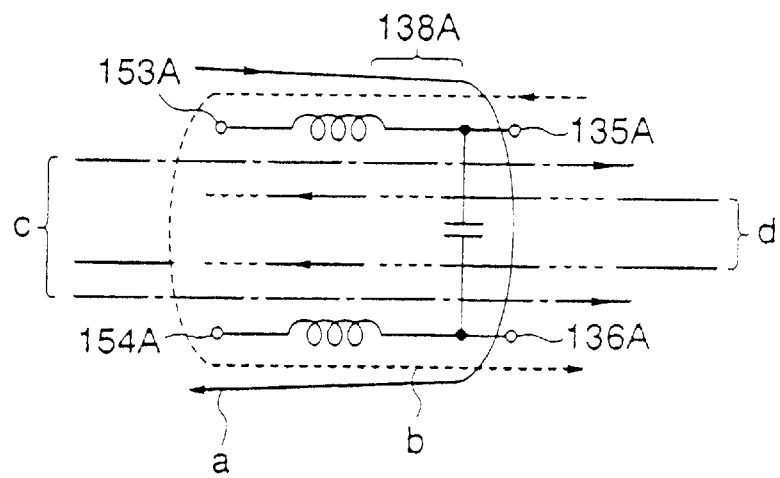
FIG. 30 is a diagram of assistance in explaining the circulation of noises.

In the construction shown in FIG. 25, noises b and d shown in FIG. 30 are suppressed by a choke coil provided across terminals 153A and 135A, and noises a and c shown in FIG. 30 are suppressed by a choke coil inserted across terminals 154A and 136A.

The circuit configuration shown in FIG. 25 explaining the position at which the potential is extracted according to the present invention can be applied to the portable a-c power generating apparatus 1 shown in FIG. 10 comprising inverters according to the present invention. In this case, a differential amplifier A corresponds to the output voltage detecting circuit 63.

The operation of the portable a-c power generating apparatus 1 shown in FIG. 10 to which the circuit configuration shown in FIG. 25 explaining the position at which the potential is extracted is applied is omitted because it has been described in detail in the foregoing.

In bringing in the output voltage of the inverter circuit 37, a first potential is extracted from an alternating voltage output terminal on the side of one of two choke coils provided in series between the two alternating voltage output terminals and the two load-side terminals of the inverter circuit 37, and a second potential is extracted from the load-side terminal on the side of the other choke coil. With this arrangement, the noise from the side of the inverter is suppressed by one of the choke coils, while the noise from the load side is suppressed by the other choke coil, with the result that noises from the inverter side and from the load side can be suppressed appropriately.

What is claimed is:

1. An inverter parallel operation system comprising
    a first inverter that can control output frequency by controlling a control element constituting the inverter, and
    second and subsequent inverters that can control output frequencies by controlling control elements constituting the inverters;
    power being fed to a common load after a choke coil provided on the output-side end of a first filter provided on the output side of the first inverter has been connected to a choke coil provided on the output-side end of the second filter provided on the output side of the second and subsequent inverters, the improvement comprising
        a means for controlling effective powers output by the two inverters by detecting effective powers output by the first inverter and/or the second and subsequent inverters and controlling any one or both of output frequencies determined in accordance with the detected effective powers.

2. An inverter parallel-operation system as set forth in claim 1 wherein the means for controlling effective powers output by the two inverters by detecting effective powers output by the first inverter and/or the second and subsequent inverters and controlling any one or both of output frequencies determined in accordance with the detected effective powers comprises
    an effective power detecting means for detecting the effective powers of a-c outputs output by the first inverter and/or the second and subsequent inverters, and
    a control means for controlling in such a direction as to lower the frequency of the output voltage as the effective powers detected by the effective power detecting means increase.

3. An inverter parallel operation system as set forth in claim 2 wherein the effective power detecting means detects effective powers during at least a half-cycle period of the a-c output voltage.

4. An inverter parallel operation system as set forth in claim 2 wherein the effective-power detecting means has an output current detecting means for detecting an output current in an average value.

5. An inverter parallel operation system as set forth in claim 2 wherein the effective power detecting means has an output current detecting means for detecting an output current in a root-mean square value.

6. An inverter parallel operation system as set forth in claim 2 wherein the effective power detecting means has an output voltage detecting means for detecting a high-frequency output voltage from the inverter circuit after converting the high-frequency output voltage into a sine-wave a-c voltage with a filter.

7. An inverter parallel operation system comprising
    a first inverter that receives power from a d-c circuit having a smoothing capacitor and can control any one or both of an output voltage and an output phase by controlling a control element constituting the inverter, and
    second and subsequent inverters that receive power from d-c circuits having smoothing capacitors and can control any one or both of an output voltage and an output phase by controlling control elements constituting the inverters;
    power being fed to a common load after a first filter circuit provided on the output side of the first inverter has been connected to a second filter circuit provided on the output side of the second and subsequent inverters, the improvement comprising
        a first effective power detecting means for detecting effective power output by the first inverter,
        second and subsequent effective power detecting means for detecting effective powers output by the second and subsequent inverters,
        a first power value calculating means for calculating the total amount of power by integrating powers detected by the first effective power detecting means, and
        second and subsequent power value calculating means for calculating the total amount-of power by integrating powers detected by the second and subsequent effective power detecting means;
        the inverter having a power value calculating means whose output power assumes a negative value, among the first, and second and subsequent power value calculating means, has an output voltage increasing means for increasing the output voltage in that inverter in accordance with the negative power value calculated by the power value calculating means.

8. An inverter parallel operation system as set forth in claim 7 wherein the output voltage increasing means initiates the increasing of the output voltage in the inverter when the negative power value calculated by the power value calculating means becomes more negative than a predetermined threshold value.

9. An inverter parallel operation system as set forth in claim 7 wherein
    a smoothing capacitor terminal voltage detecting means for detecting the terminal voltage of the smoothing capacitor in each inverter is provided, and
    the inverter in which the terminal voltage detected by the smoothing capacitor terminal voltage detecting means becomes a smaller value than a predetermined threshold value has a power value resetting means for resetting a calculated negative power value to an initial value, including zero, when a power value calculated by the corresponding power value calculating means is a negative value.

10. An inverter parallel operation system as set forth in claim 9 wherein a plurality of threshold values are predetermined for the terminal voltage detected by the smoothing capacitor terminal voltage detecting means, so that the power value resetting means resets the power value calculated by the power value calculating means to an initial value predetermined for each threshold value when the detected terminal voltage is within the corresponding threshold value.

11. An inverter parallel operation system comprising
 a first inverter that can control output voltage and output phase by controlling a control element constituting the inverter, and
 second and subsequent inverters that can control output voltages and output phases by controlling control elements constituting the inverters;
 power being fed to a common load after the output-side end of a filter provided on the output side of the first inverter has been connected to the output-side end of a filter provided on the output-side of the second and subsequent inverters, the improvement comprising
  a means for controlling to equalize the effective powers of the first inverter and/or the second and subsequent inverters by controlling the output phases of the inverters, and
  a means for controlling to equalize the reactive powers from the first inverter and/or the second and subsequent inverters by controlling the internal voltages of the inverters.

12. An inverter parallel operation system as set forth in claim 11 wherein when controlling to equalize the reactive powers from the inverters, the internal voltage E of the inverter being controlled is caused to change by $$\Delta S = \alpha(I - I_r')\sin\phi$$

where I is an output current from the inverter being controlled, $I_r'$ is a given set current value, $\phi$ is the phase difference between the internal voltage E or the output voltage V and the output current I in the inverter, and $\alpha$ is a given coefficient.

13. An inverter parallel operation system as set forth in claim 11 wherein when controlling to equalize the reactive powers from the inverters, the internal voltage E of the inverter being controlled is caused to change by $$\Delta S = \alpha(I - I_r')\phi$$

where I is an output current from the inverter being controlled, $I_r'$ is a given set current value, $\phi$ is the phase difference between the internal voltage E or the output voltage V and the output current I in the inverter, and a is a given coefficient.

14. An inverter parallel operation system as set forth in claim 11 wherein when controlling to equalize the reactive powers from the inverters, the internal voltage E of the inverter being controlled is caused to change by $$\Delta S = \alpha(I - I_r') = \beta$$

where I is an output current from the inverter being controlled, $I_r'$ is a given set current value, $\phi$ is the phase difference between the internal voltage E or the output voltage V and the output current I in the inverter, and $\alpha$ is a given coefficient (when $\sin\phi$ or the absolute value of $\phi$ is less than a predetermined value, $\sin\phi$ or the value of $\phi$ is used as $\oplus$, and when the absolute value is more than the predetermined value, $\sin\phi$ or the absolute value of $\phi$ at that predetermined value is fixed, and the fixed value is used as $\beta$.).

15. An inverter parallel operation system as set forth in claim 11 wherein when causing the internal voltage E to change, control is effected only in the direction to reduce the internal voltage E.

16. An inverter parallel operation system as set forth in claim 11 wherein when causing the internal voltage E to change, control is effected only in the direction to increase the internal voltage E.

17. An inverter parallel operation system as set forth in claim 11
 wherein when causing the internal voltage E to change, the degree of control is changed, depending on whether control is effected in the direction to reduce the internal voltage E or in the direction to increase the internal voltage E.

18. An inverter parallel operation system as set forth in claim 11
 wherein when causing the internal voltage E to change, limit values are set for the amount of change in the internal voltage E.

19. An inverter parallel operation system comprising
 a first inverter that can control output voltage and output phase by controlling a control element constituting the inverter, and
 second and subsequent inverters that can control output voltages and output phases by controlling control elements constituting the inverters;
 power being fed to a common load after the output-side end of a filter provided on the output side of the first inverter has been connected to the output-side end of a filter provided on the output-side of the second and subsequent inverters, the improvement comprising
  a means for controlling to equalize the reactive powers of the first inverter and/or the second and subsequent inverters by controlling the internal voltages of the inverters,
  a means for causing the output voltage of an inverter to minutely change in a predetermined period in accordance with the reactive current or reactive power detected by the inverter itself and notifying the state of detection of reactive current or reactive power to the other inverters, and
  a means for detecting a change in the inverter output current or power of the inverter itself in accordance with the notification from the other inverter, and gradually changing the output voltage of the inverter itself so that the value of change in the inverter output current or power is kept below a predetermined value.

20. An inverter parallel operation system as set forth in claim 19 wherein the range of minute change in the output voltage is determined in accordance with the magnitude of the root-mean square value or average value of the detected reactive current or reactive power.

21. An inverter parallel operation system as set forth in claim 19 wherein the period is made different by minutely changing the output voltage, depending on whether the detected reactive current or reactive power is of a lead phase or of a lag phase with respect to the phase of the output voltage.

22. An inverter parallel operation system in claim 19 wherein when the inverters are in parallel operation at the start of operation, the output voltage of an inverter is caused to change so that the output current of the inverter itself is kept within a predetermined value prior to performing control to minutely change the output voltage in the period.

23. An inverter parallel operation system as set forth in claim 19
wherein the rate of gradual change in the output voltage of an inverter is determined in accordance with the magnitude of the root-mean square value or average value of the detected inverter output current, or output power.

* * * * *